(12) United States Patent
Ikeda

(10) Patent No.: US 8,514,297 B2
(45) Date of Patent: Aug. 20, 2013

(54) IMAGE SENSING APPARATUS AND IMAGE PROCESSING METHOD

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/039,126

(22) Filed: Mar. 2, 2011

(65) Prior Publication Data

US 2011/0205391 A1    Aug. 25, 2011

Related U.S. Application Data

(62) Division of application No. 11/472,096, filed on Jun. 20, 2006, now Pat. No. 8,013,906.

(30) Foreign Application Priority Data

Jun. 20, 2005    (JP) ................................ 2005-179645

(51) Int. Cl.
 *H04N 9/73*    (2006.01)
 *G06K 9/00*    (2006.01)
 *G06K 9/40*    (2006.01)

(52) U.S. Cl.
 USPC .................... 348/223.1; 382/118; 382/274

(58) Field of Classification Search
 USPC ............... 348/223.1, 218, 274; 382/118, 274
 See application file for complete search history.

(56) References Cited

U.S. PATENT DOCUMENTS

| | | | |
|---|---|---|---|
| 6,940,545 B1 * | 9/2005 | Ray et al. | 348/222.1 |
| 7,148,921 B2 * | 12/2006 | Ikeda et al. | 348/223.1 |
| 7,397,502 B2 * | 7/2008 | Shiraishi | 348/223.1 |
| 2003/0001958 A1 * | 1/2003 | Hoshuyama | 348/223.1 |
| 2003/0169348 A1 * | 9/2003 | Ikeda et al. | 348/223.1 |
| 2003/0235333 A1 * | 12/2003 | Lin | 382/167 |
| 2004/0179719 A1 | 9/2004 | Chen et al. | |
| 2007/0242143 A1 * | 10/2007 | Sugimoto | 348/240.2 |

* cited by examiner

*Primary Examiner* — Roberto Velez
*Assistant Examiner* — Tuan Le
(74) *Attorney, Agent, or Firm* — Canon U.S.A., Inc. IP Division

(57) ABSTRACT

An image sensing apparatus that senses objects and processes image signals obtained from such image sensing includes a white balance correction means that performs white balance correction of the image signals using white balance correction values calculated based on a face area and on other areas contained in the image signals, and a CPU that changes the proportion of image signals of the face area used in calculating the white balance correction values when calculating the white balance correction values based on the image signals.

4 Claims, 24 Drawing Sheets

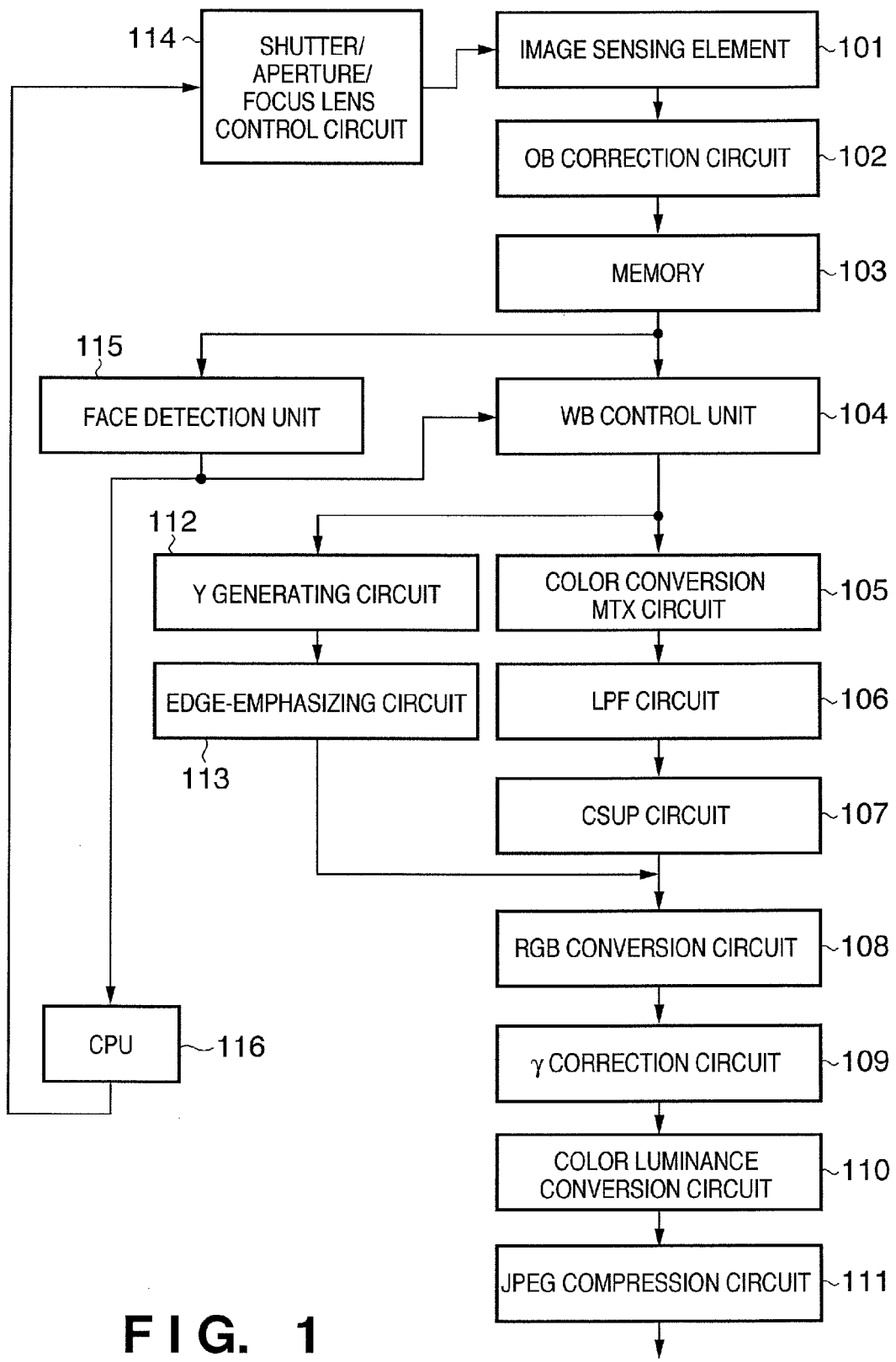
F I G. 1

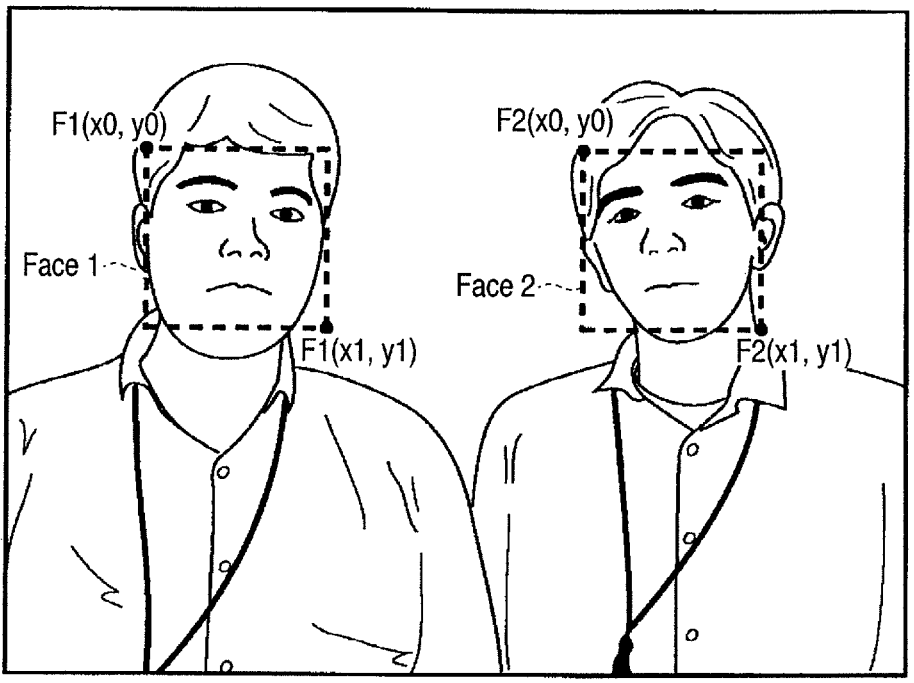

FIG. 2A

```
FACE INFORMATION
Face 1
FACE COORDINATES     UPPER LEFT      F1(x0, y0)
                     LOWER RIGHT     F1(x1, y1)
                     CENTER          F1(x_Center, y_Center)
EYE COORDINATES      LEFT EYE        F1(x_LeftEye, y_LeftEye)
                     RIGHT EYE       F1(x_RightEye, y_RightEye)
DEGREE OF RELIABILITY                F1(rel)  (VALUE BETWEEN 0~1)

Face 2
FACE COORDINATES     UPPER LEFT      F2(x0, y0)
                     LOWER RIGHT     F2(x1, y1)
                     CENTER          F2(x_Center, y_Center)
EYE COORDINATES      LEFT EYE        F2(x_LeftEye, y_LeftEye)
                     RIGHT EYE       F2(x_RightEye, y_RightEye)
DEGREE OF RELIABILITY                F2(rel)  (VALUE BETWEEN 0~1)
```

FIG. 2B

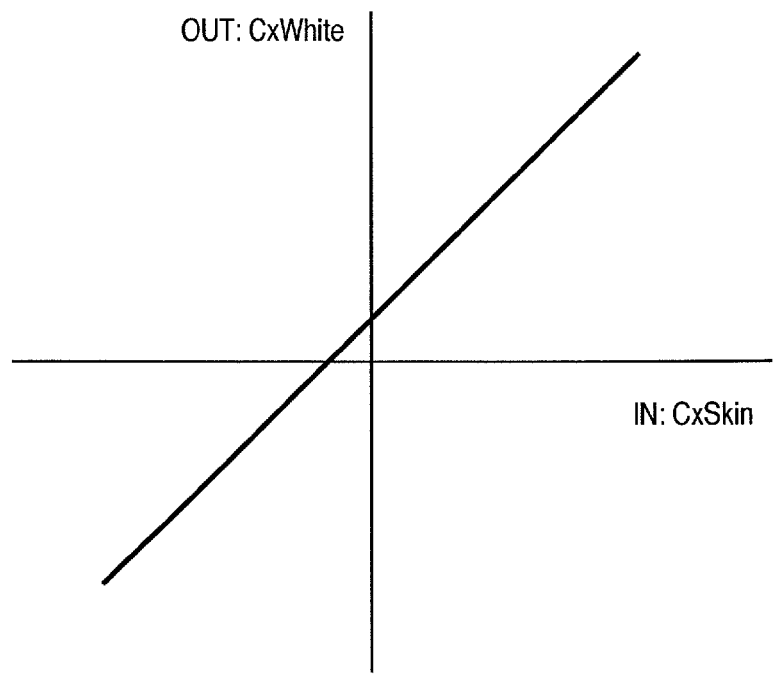
F I G. 17A
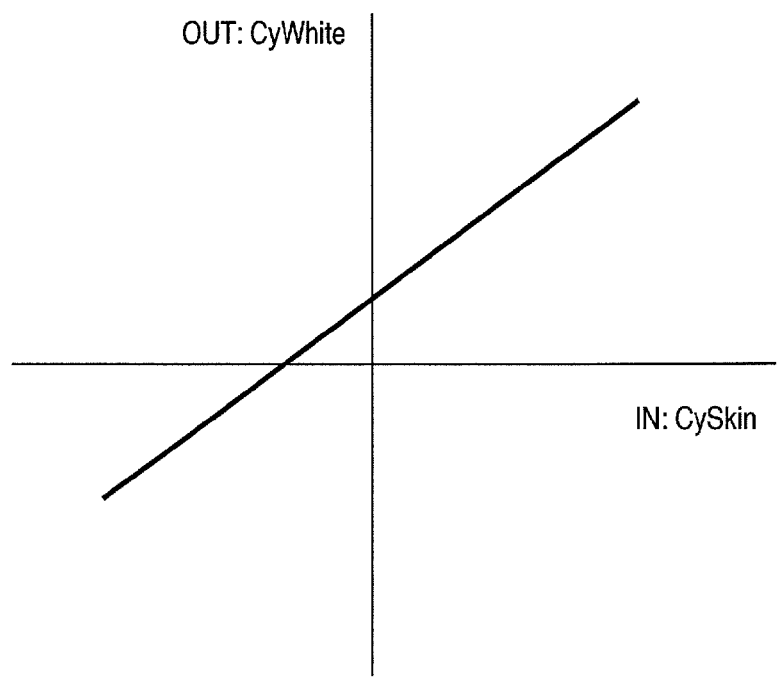
F I G. 17B

F I G. 22

F I G. 24
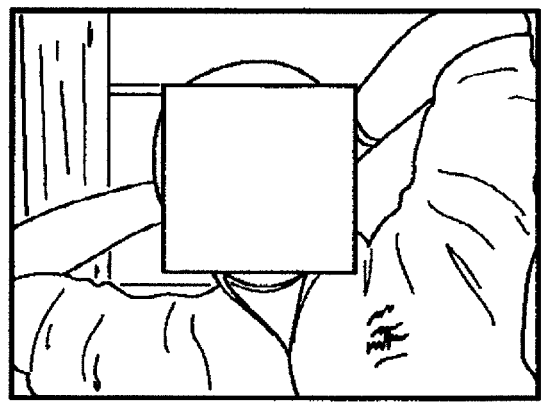
F I G. 25

IMAGE SENSING APPARATUS AND IMAGE PROCESSING METHOD

CROSS REFERENCE TO RELATED APPLICATIONS

This application is a division of U.S. patent application Ser. No. 11/472,096, filed Jun. 20, 2006 now U.S. Pat. No. 8,013, 906, which claims priority from Japanese Patent Application No. 2005-179645, filed Jun. 20, 2005, both of which are hereby incorporated by reference herein in their entirety.

FIELD OF THE INVENTION

The present invention relates to an image sensing apparatus, such as a digital camera, a digital video camera and the like, and an image processing method that processes an image signal obtained by image sensing, and more particularly, to white balance correction and an image processing method in an image sensing apparatus that performs face detection.

BACKGROUND OF THE INVENTION

A description is now given of the operation of a conventional white balance gain calculation circuit used in digital cameras and the like. First, as shown in FIG. 22, the screen is divided into an arbitrary plurality of blocks (m) in advance. Then, at each block (1 through m), the pixel values are added and averaged for each color, color averages (R[i], G[i], B[i]) are calculated, and color evaluation values (Cx[i], Cy[i]) are calculated using, for example, equation (1) below:

$$Cx[i]=(R[i]-B[i])/Y[i]\times 1024$$

$$Cy[i]=(R[i]+B[i]-2G[i])/Y[i]\times 1024 \quad (1)$$

where $Y[i]=R[i]+2G[i]+B[i]$, and [i] is the index number of each block.

Then, white objects are sensed under a variety of light sources in advance and color evaluation values are calculated. By doing so, in a case in which the color evaluation values calculated at each block are included in a white detection range 301 like that shown in FIG. 23 that is set in advance, that block is judged to be white and the pixel values of blocks similarly deemed white are integrated. The white detection range 301 plots color evaluation values in which white is sensed under different light conditions and calculated in advance, with the negative direction of the x coordinate (Cx) shown in FIG. 23 indicating the color evaluation value when sensing the white of a high color temperature object and the positive direction indicating the color evaluation value when sensing the white of a low color temperature object. The y coordinate (Cy) indicates the green color component degree of the light source. The greater the extent in the negative direction the greater the G component, the greater the likelihood that the light source is a fluorescent light.

Then, white balance coefficients (WBCo_R, WBCo_G, WBCo_B) are calculated from the integrated pixel values (sumR, sumG, sumB) using equation (2) below:

$$WBCo\_R=sumY\times 1024/sumR$$

$$WBCo\_G=sumY\times 1024/sumG$$

$$WBCo\_B=sumY\times 1024/sumB \quad (2)$$

where $sumY=(sumR+2\times sumG+sumB)/4$.

However, the following problem arises with the conventional white balance gain calculation method when taking close-up shots of a person's face as shown in FIG. 24. That is, because the color evaluation value of a complexion area sensed under sunlight (indicated by 9-1 in FIG. 23) and the color evaluation value of white objects sensed under tungsten light (shown as 9-2 in FIG. 23) are substantially identical, sometimes complexion is erroneously judged to be white under tungsten light and the complexion corrected to white.

To correct the foregoing problem, removing the face area detected by a face detection circuit from white detection (see FIG. 25) has been proposed (Japanese Patent Laid-open No. 2003-189325).

However, in such conventional white balance gain calculation method, no consideration is given in the face detection circuit to handling cases in which the face is erroneously identified or cannot be detected. As a result, if the face detection circuit erroneously detects an area that is not a face as a face, the white detection target area decreases, causing the accuracy of the output color temperature information to decline. In addition, in a case in which an area is not recognized as a person's face even though it is a face, because white detection is implemented in the face area the accuracy of the white balance correction declines as a result.

Moreover, where a close-up is taken of a person's face as shown in FIG. 24, if the face area is removed from the white detection target areas, the object areas for implementing white detection practically disappear, resulting in a decrease in white balance correction accuracy.

SUMMARY OF THE INVENTION

An aspect of the present invention is an image sensing apparatus that senses objects and processes image signals obtained from such image sensing, comprising: a white balance correction unit adapted to perform white balance correction of the image signals using white balance correction values calculated based on a face area and on other areas contained in the image signals; and a control unit adapted to change the proportion of image signals of the face area used in calculating the white balance correction values when calculating the white balance correction values based on the image signals.

According to the present invention, the foregoing object is also attained by providing an image sensing apparatus that senses objects and processes image signals obtained from such image sensing, comprising: a face detection unit adapted to detect a face area from the image signals; a white balance correction unit adapted to perform white balance correction of the image signals using white balance correction values; and a control unit adapted to control the white balance correction unit depending on a degree of reliability indicating a probability that the face area detected by the face detection unit is a face.

According to the present invention, the foregoing object is also attained by providing an image sensing apparatus that senses objects and processes image signals obtained from such image sensing, comprising: a face detection unit adapted to detect a face area from the image signals and acquiring attribute information on the detected face area; a first calculation unit adapted to calculate first white balance correction values using image signals deemed white from among the image signals; a second calculation unit adapted to calculate second white balance correction values using image signals of the face area detected by the face detection unit from among the image signals; a third calculation unit adapted to calculate third white balance correction values by weighting and combining the first white balance correction values and the second white balance correction values based on the attribute information acquired by the face detection unit; and a white balance correction unit adapted to perform white balance correction using the third white balance correction values.

According to the present invention, the foregoing object is also attained by providing an image sensing apparatus that senses objects and processes image signals obtained from such image sensing, comprising: a face detection unit adapted to detect a face area from the image signals and acquiring attribute information from the detected face area; a weighting determination unit adapted to determine a weight to be assigned to each of a plurality of divisions into which the image signals are divided based on whether or not image signals of the divisions are white, whether the divisions are included in a face area, and the attribute information; a white balance correction values calculation unit adapted to calculate white balance correction values based on image signals consisting of the image signals weighted and added using weights assigned by the weighting determination unit at each of the divisions; and a white balance correction unit adapted to perform white balance correction using the white balance correction values.

According to the present invention, the foregoing object is also attained by providing an image processing method of processing image signals obtained by sensing objects, comprising: a white balance correction step of performing white balance correction of the image signals using white balance correction values calculated based on a face area and on other areas contained in the image signals; and a control step of changing the proportion of image signals of the face area used in calculating the white balance correction values when calculating the white balance correction values based on the image signals.

According to the present invention, the foregoing object is also attained by providing an image processing method of processing image signals obtained by sensing objects, comprising: a face detection step of detecting a face area from the image signals; a white balance correction step of performing white balance correction of the image signals using white balance correction values; and a control step of controlling the white balance correction step depending on a degree of reliability indicating a probability that the face area detected in the face detection step is a face.

According to the present invention, the foregoing object is also attained by providing an image processing method of processing image signals obtained by sensing objects, comprising: a face detection step of detecting a face area from the image signals and acquiring attribute information on the detected face area; a first calculation step of calculating first white balance correction values using image signals deemed white from among the image signals; a second calculation step of calculating second white balance correction values using image signals of the face area detected in the face detection step from among the image signals; a third calculation step of calculating third white balance correction values by weighting and combining the first white balance correction values and the second white balance correction values based on the attribute information acquired in the face detection step; and a white balance correction step of performing white balance using the third white balance correction values.

According to the present invention, the foregoing object is also attained by providing an image processing method of processing image signals obtained by sensing objects, comprising: a face detection step of detecting a face area from the image signals and acquiring attribute information from the detected face area; a weighting determination step of determining a weight to be assigned to each of a plurality of divisions into which the image signals are divided based on whether or not image signals of the divisions are white, whether the divisions are included in a face area, and the attribute information; a white balance correction values calculation step of calculating white balance correction values based on image signals consisting of the image signals weighted and added using weights assigned in the weighting determination step at each of the divisions; and a white balance correction step of performing white balance correction using the white balance correction values.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a schematic block diagram showing the functional structure of an image sensing apparatus equipped with a face detection capability according to a first embodiment of the present invention;

FIGS. 2A and 2B are diagrams illustrating face information according to the first embodiment of the present invention;

FIGS. 17A, 17B are diagrams showing complexion evaluation value versus white evaluation value corresponding straight lines according to the second embodiment of the present invention;

FIG. 22 is a diagram showing an example in which the screen is divided into an arbitrary number of multiple blocks;

FIG. 24 is a diagram showing an example in which the object is a close-up shot of a face; and FIG. 25 is a diagram illustrating a conventional example in which the face area is removed from white detection.

DETAILED DESCRIPTION OF THE PREFERRED EMBODIMENTS

Figure 3:
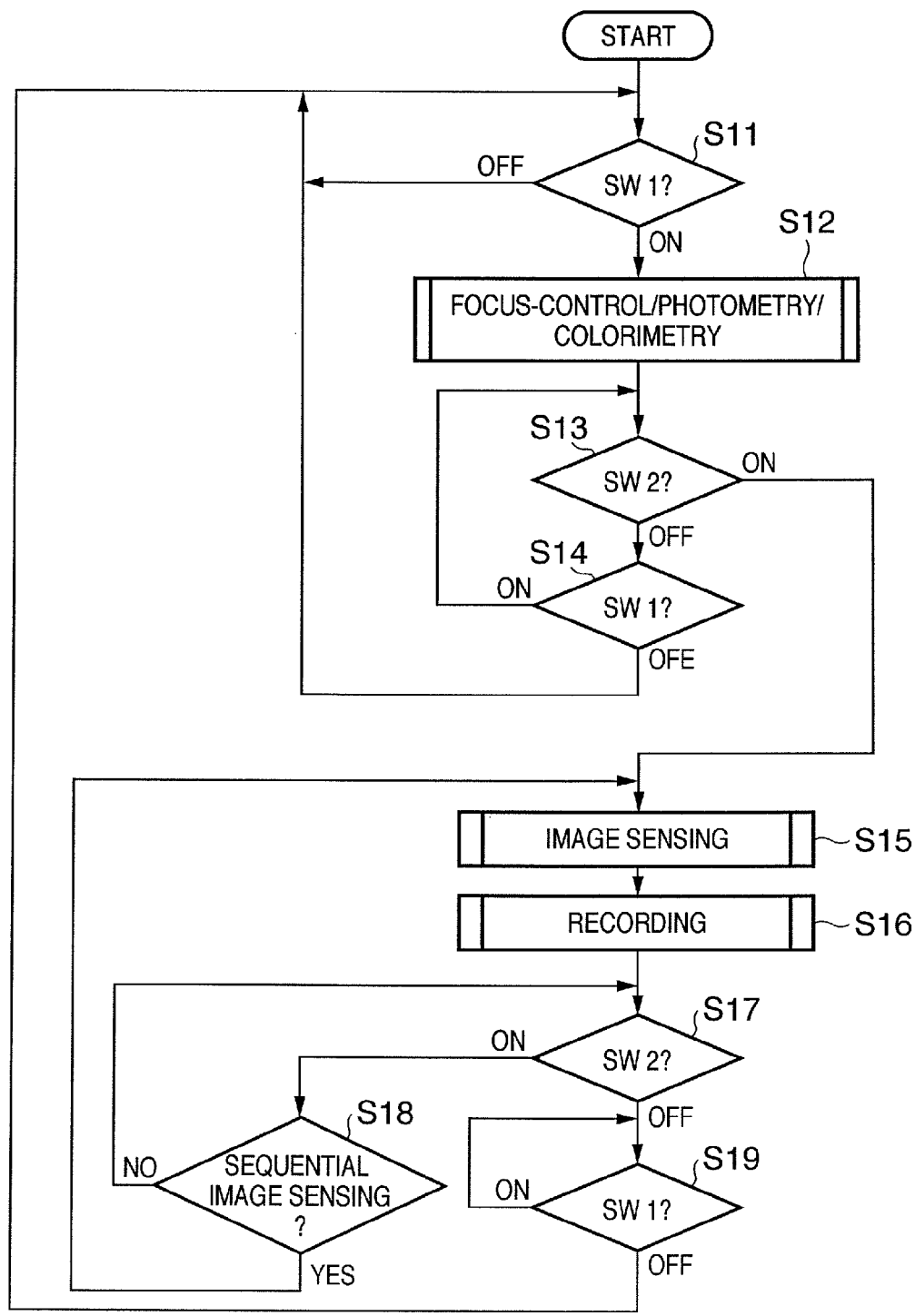
FIG. 3 is a flow chart illustrating an image sensing process according to the first embodiment of the present invention.

Preferred embodiments of the present invention will now be described in detail in accordance with the accompanying drawings.

First Embodiment

FIG. 1 is a schematic block diagram showing the functional structure of an image sensing apparatus equipped with a face detection function according to a first embodiment of the present invention.

In FIG. 1, reference numeral 101 indicates a solid-state image sensing element composed of CCD, CMOS and the like, the front surface of which is covered by, for example, a Bayer Layout RGB color filter and thus has a structure that is capable of taking color photographs. Reference numeral 102 indicates an OB (Optical Black) correction circuit 102, which performs a dark current removal process by subtracting the dark current signals obtained from the light-shielding part provided on the image sensing element 101 from the image signals obtained from the exposed areas of the image sensing element 101. The image signals processed for dark current removal by the OB correction circuit are temporarily stored in the memory 103.

Reference numeral 115 indicates a face detection unit that performs detection of the face using the image signals stored in the memory 103. When the face detection unit 115 detects faces (Face 1, Face 2) by a well-known method as shown in FIG. 2A, it stores face information like that shown in FIG. 2B in the memory. This face information includes coordinate values expressing the area and the center of the face portion, left- and right-eye coordinate values and the degree of reliability (indicating the degree of reliability with which things other than the face are not erroneously detected as the face). It should be noted that the memory used here may be the memory 103 described above or some other internal memory.

A description is now given of a method for obtaining the degree of reliability described above.

First, the face portion is extracted from the image signals. Specifically, the face portion is extracted, for example, by a method like the following: First, the extraction of the face portion involves filtering the image signals by horizontal and vertical band pass filters and detecting the edges of the face portion. Then, the edges are digitized and the texture is detected. The detected texture is then sent to a pattern recognition circuit that recognizes the parts of the face, such as the profile of the face, the eyes, nose, mouth, etc., and narrowed down to face parts candidates.

Next, the extracted face parts candidates described above are passed through a non-face filter and the parts are narrowed down. Specifically, for example, the detected face parts are passed through multiple non-face filters, assigned scores, and parts with scores at or above a score set in advance are considered face parts.

For example, the face parts candidates are passed through such filters as 1) whether the detected eye candidate parts are a set or not, 2) with the set of eye parts, is there anything unnatural about the size of the eyes and the distance between them, 3) are there nose and mouth parts centrally below the center of the space between the eyes, and 4) is the color around the eyes the color of complexion. Then, points are assigned at threshold values set in advance for each of the filters, and the face parts whose scores at or above the scores are output as a face.

Here, the above-described scores are reflected in the degree of reliability, such that, for example, the degree of reliability is 1 at or above a certain score and the degree of reliability is 0.5 at or below a certain score (where the maximum degree of reliability is 1 and the minimum degree of reliability is 0).

In addition, the face detection unit 115 sends the image signals corresponding to the detected face portion (that is, image signals inside an area defined by the coordinate values of the face portion) to a CPU 116. It should be noted that, where a human face cannot be detected, information indicating that a face cannot be detected is recorded in the memory and the image signals stored in the memory 103 are sent as is to the CPU 116.

At the CPU 116, if a human face is detected based on the image signals sent from the face detection unit 115, the shutter speed Tv and the aperture value Av that provide the brightness best suited to the face are calculated, and the focus lens drive amount that brings the face into focus is calculated. On the other hand, if a human face is not detected, the CPU 116 calculates the shutter speed Tv and the aperture value Av that provide the optimum brightness for the image as a whole and calculates the focus lens drive amount that will bring that part of the object that is within a pre-set focus area into focus. The exposure values (Tv, Av) and focus lens drive amount calculated by the CPU 116 are sent to a shutter/aperture/focus lens control circuit 114 and the lens, aperture and shutter, not shown, and the image sensing element 101 are adjusted based on the values.

Reference numeral 104 indicates a white balance (WB) control unit, which calculates WB correction values based on the image signals stored in the memory 103 and on the face information obtained from the face detection unit 115 and performs WB correction on the image signals stored in the memory 103 using the calculated WB correction values. A detailed description of the exact structure of the WB control unit 104 and of methods for calculating the WB correction values is given later.

Reference numeral 105 indicates a color conversion MTX circuit that adds color gain and converts to color difference signals R-Y, B-Y so that the image signals that are WB-corrected by the WB control unit 104 are reproduced in the most appropriate colors. Reference numeral 106 indicates a low-pass filter (LPF) circuit that restricts the bandwidth of the color difference signals R-Y, B-Y, and 107 indicates a CSUP (Chroma Suppress) circuit that suppresses pseudo color signals of the saturated portion of the image signals restricted in bandwidth by the LPF circuit 106.

At the same time, the image signals that are WB-corrected by the WB control unit 104 are also output to a luminance signal (Y) generating circuit 112 and a luminance signal Y is generated. The generated luminance signal Y is then edge-emphasis processed by an edge-emphasizing circuit 113.

The color difference signals R-Y, B-Y output from the CSUP circuit 107 and the luminance signal Y output from the edge-emphasizing circuit 113 are then converted into RGB signals by an RGB conversion circuit 108 and tonally corrected by a gamma correction circuit 109, after which they are converted into YUV signals by a color luminance conversion circuit 110, further compressed by a compression circuit 111 and then recorded as image signals on an external recording medium or an internal recording medium such as a compact flash (registered trademark) or the like.

Next, a description will be given of an image sensing process in the image sensing apparatus having the structure described above, with reference to FIGS. 3-6. It should be noted that this process is performed when the apparatus is set to an image sensing mode by a mode dial or the like, not shown.

First, in step S11, the state of a shutter switch, not shown, is checked. When the shutter switch is pressed halfway (half-stroke) by the user (SW 1 ON), the image sensing process proceeds to step S12 and a focus-control/photometry/colorimetry process is performed. A detailed description of this focus-control/photometry/colorimetry process is given later, with reference to FIG. 4. When the focus-control/photometry/colorimetry process (step S12) is finished, the image sensing process proceeds to step S13.

If the shutter switch, not shown, now at half-stroke (SW 1 ON) is released (OFF in step S14) without being fully depressed (full-stroke) (SW 2 ON) (OFF in step S13), then the image sensing process returns to step S11 and the process described above is repeated. If the shutter switch remains at half-stroke (SW 1 ON) (ON in step S14) without being fully depressed (full-stroke) (SW 2 ON) (OFF in step S13), then the image sensing process returns to step S13. When the shutter switch is fully depressed (SW 2 ON) (ON in step S13), the image sensing process proceeds to step S15.

In step S15, the image sensing process is executed. The details of the image sensing process performed in step S15 are described later, with reference to FIG. 5. After the image sensing process of step S15 is finished, the image sensing process proceeds to step S16 and a recording process is executed. The recording process performed in step S16 is described in detail later, with reference to FIG. 6.

When the recording process performed in step S16 is finished, it is investigated in step S17 whether or not the shutter switch is fully depressed (SW 2 ON). If ON, the image sensing process proceeds to step S18 and it is confirmed that the image sensing apparatus is in a sequential image sensing mode. If the apparatus is not set to the sequential image sensing mode, the image sensing process returns to step S17, the apparatus stands by for full depression of the shutter switch (SW 2 ON) and the image sensing process proceeds to step S19. If the apparatus is set to the sequential image sensing mode, then the image sensing process returns to step S15 and the next photograph is taken. On the other hand, if the full depression of the shutter switch (SW 2 ON) is released (OFF in step S17), in step S19 the apparatus stands by for the half-stroke of the shutter switch (SW 1 ON) to be released. Once released, the image sensing process returns to step S11.

Figure 4:
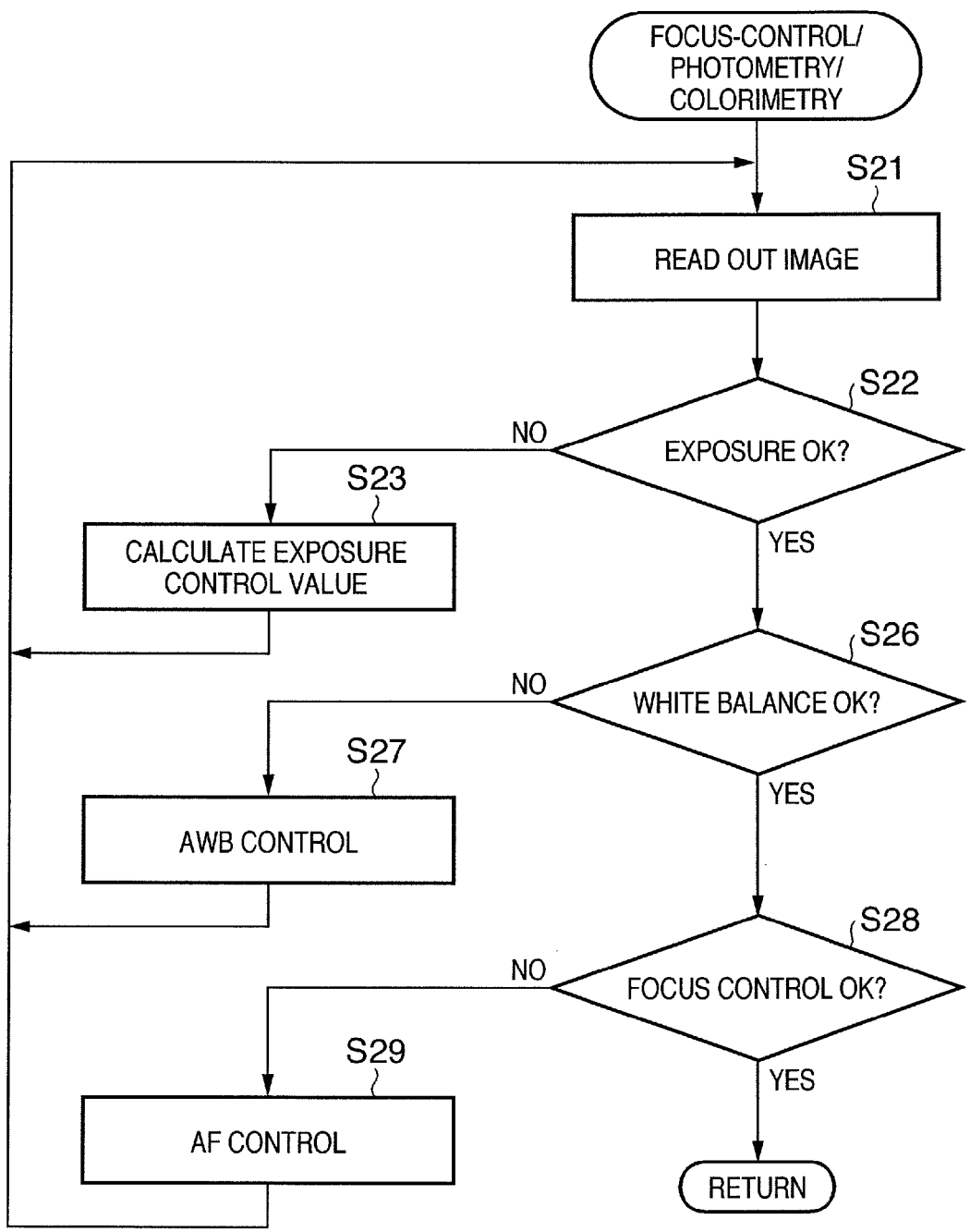
FIG. 4 is a flow chart illustrating a focus-control/photometry/colorimetry process according to the first embodiment of the present invention.

FIG. 4 is a flow chart illustrating the details of the focus-control/photometry/colorimetry process performed in step S12 shown in FIG. 3.

First, in step S21, electrical charge signals are read out from the image sensing element 101, the OB correction circuit 102 performs dark current removal and the resulting image signals are consecutively written to the memory 103. Then, the CPU 116 determines whether or not the exposure is correct from the image signals written in the memory 103 (step S22). If the CPU 116 determines that the exposure is not correct, the CPU 116 then calculates the shutter speed Tv and the aperture Av as described above (step S23) and the process returns to step S21. Based on the values calculated in step S23, the shutter/aperture/focus lens control circuit 114 adjusts the aperture and the shutter, not shown, as well as the image sensing element 101, respectively, and the electrical charge signals are once again read out. It should be noted that, as described above, where a face is detected by the face detection unit 115, of all the exposed pixel image signals, the CPU 116 uses the image signals within the detected face area for its calculations, thereby enabling exposure control suited to the face to be performed.

When in step S22 the CPU 116 determines that the exposure is correct, the calculated shutter speed Tv and the aperture Av are stored in the internal memory of the CPU 116.

Next, until it is determined that the white balance is proper (that is, as long as NO in step S26), AWB control (step S27) is performed using the WB control unit 104. A detailed description of the AWB control is given later, with reference to FIG. 7 and FIGS. 8-10.

Once it is determined that the white balance is proper (YES in step S26), the WB correction values (white balance gain) are stored in a first WB correction values holding unit 205 described later of the WB control unit 104 and the process proceeds to step S28.

In step S28, until it is determined that the image is in focus by the focus control process (that is, as long as NO in step S28) the CPU 116 performs AF control that adjusts the focus lens, not shown, (step S29). AF control involves calculating the focus lens drive amount and adjusting the focus lens, not shown, based on the focus lens drive amount calculated in the shutter/aperture/focus lens control circuit 114. It should be noted that, as described above, where a face is detected by the face detection unit 115, of all the exposed pixel image signals, the CPU 116 uses the image signals within the detected face area for its calculations, thereby enabling exposure control suited to the face to be performed.

Once it is determined by the focus control process that the image is in focus (YES in step S28), measurement data is stored in the internal memory of the CPU 116 and the focus-control/photometry/colorimetry routine S12 is ended.

It should be noted that although in the processing example described above the order of processing is exposure control followed by WB control and then focus control, the present invention is not limited thereto. Accordingly, it is of course possible that, alternatively, a different processing order may be employed or these processes may be performed in parallel.

Figure 5:
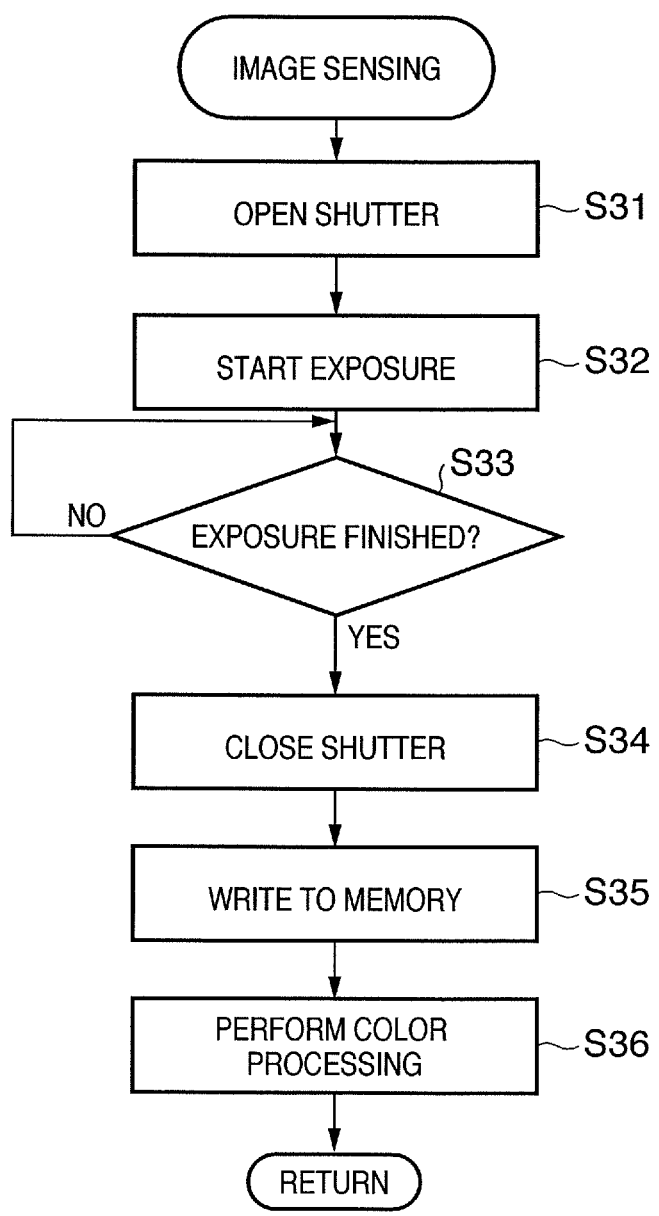
FIG. 5 is a flow chart illustrating an image sensing process according to the first embodiment of the present invention.

FIG. 5 is a flow chart illustrating in detail the image sensing process of step S15 shown in FIG. 3.

When the shutter button, not shown, is fully depressed (SW 2 ON), the shutter/aperture/focus lens control circuit 114 is adjusted in accordance with the shutter speed Tv and aperture value Av obtained as described with reference to FIG. 4. Then, the shutter, not shown, having an aperture function, is opened according to the aperture value (step S31) and exposure of the image sensing element 101 is started (step S32).

The shutter/aperture/focus lens control circuit 114 then stands by for the end of exposure of the image sensing element 101 in accordance with the shutter speed Tv (step S33). When the exposure time period ends, the process proceeds to step S34, the shutter is closed, electrical signals are read out from the image sensing element 101 and image signals processed for dark current removal by the OB correction circuit 102 are written to the memory 103 (step S35).

In step S36, the image sensing process routine (step S15) is ended after the color processes described above, including WB correction are performed in order by each of the circuits from the WB control unit 104 to the color luminance conversion circuit 110.

Figure 6:
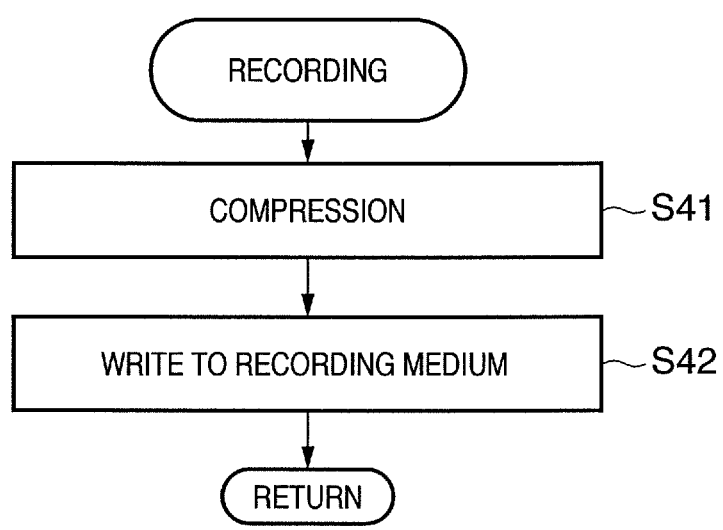
FIG. 6 is a flow chart illustrating a recording process according to the first embodiment of the present invention.

FIG. 6 is a flow chart illustrating details of the recording process of step S16 shown in FIG. 3.

In step S41, after the color-processed image data is compressed by the compression circuit 111, the compressed image data is written to an external recording medium, not shown, such as a memory card or a compact flash (registered trademark) card or to an internal recording medium (step S42). Once the writing of the compressed image data to the recording medium is finished, the recording process routine (step S16) is ended.

Next, a detailed description is given of AWB control in a first embodiment performed in step S27 of the focus-control/photometry/colorimetry process shown in FIG. 4, with reference to FIGS. 7-10.

Figure 7:
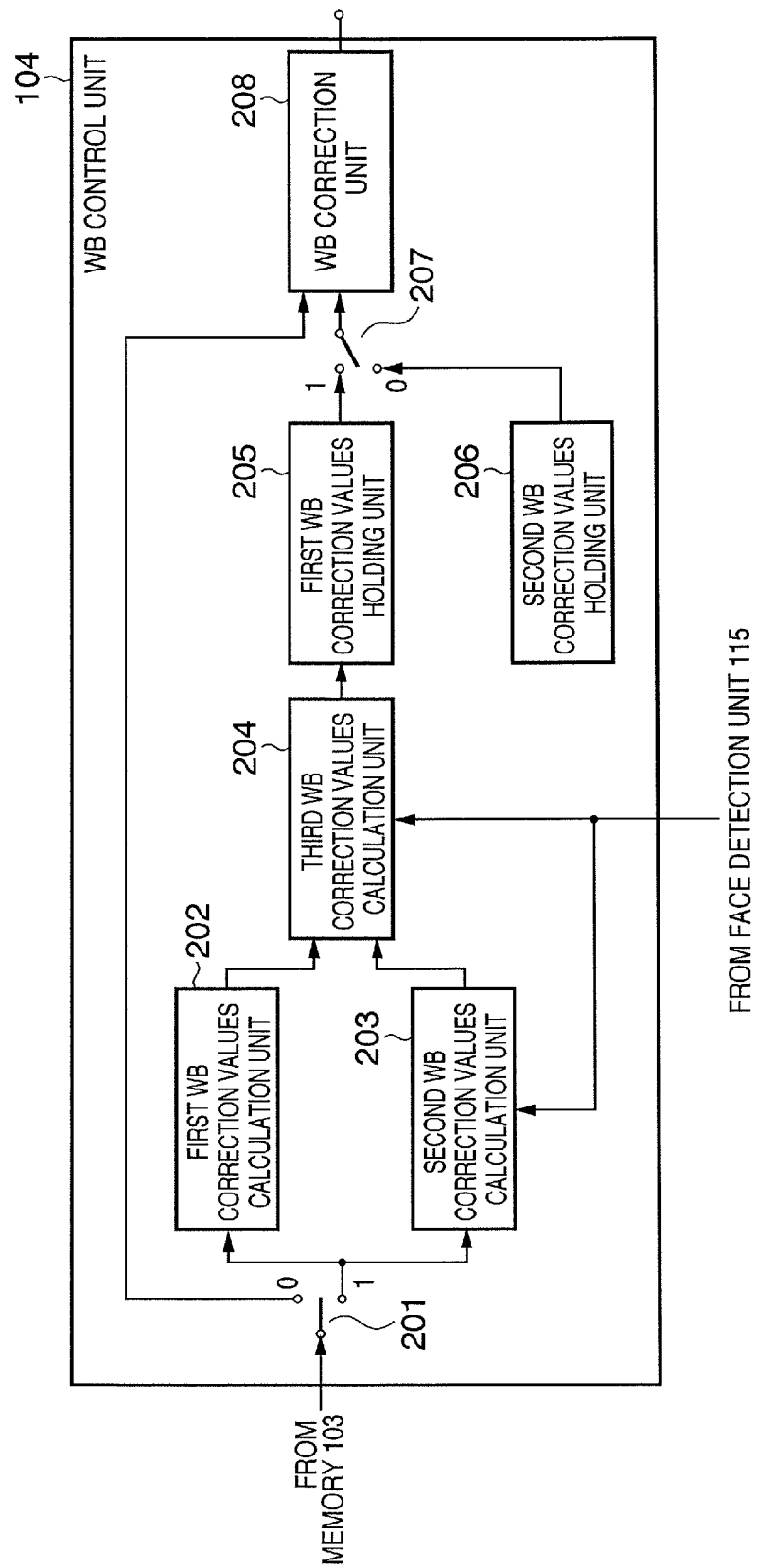
FIG. 7 is a block diagram showing the detailed functional structure of a WB (white balance) control unit according to the first embodiment of the present invention.
Figure 8:
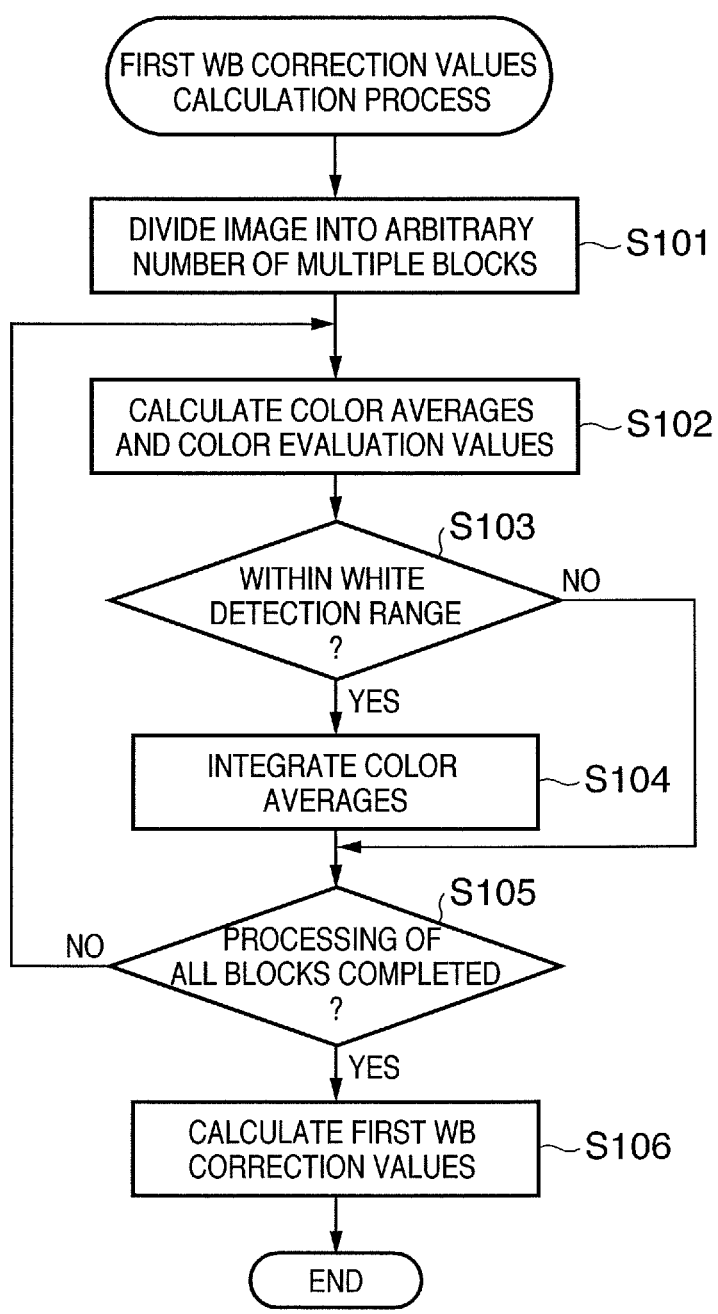
FIG. 8 is a flow chart illustrating a first WB correction values calculation process according to the first embodiment of the present invention.
Figure 9:
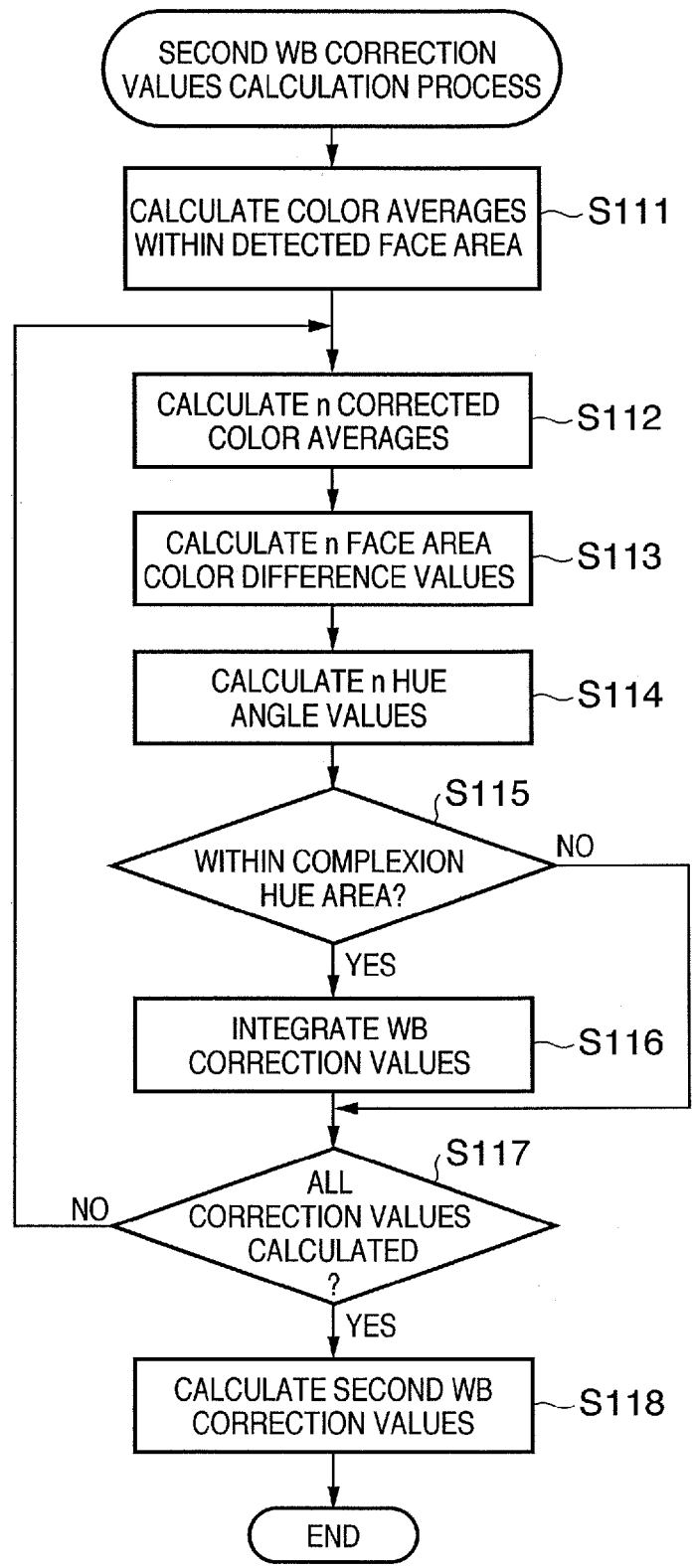
FIG. 9 is a flow chart illustrating a second WB correction values calculation process according to the first embodiment of the present invention.
Figure 10:
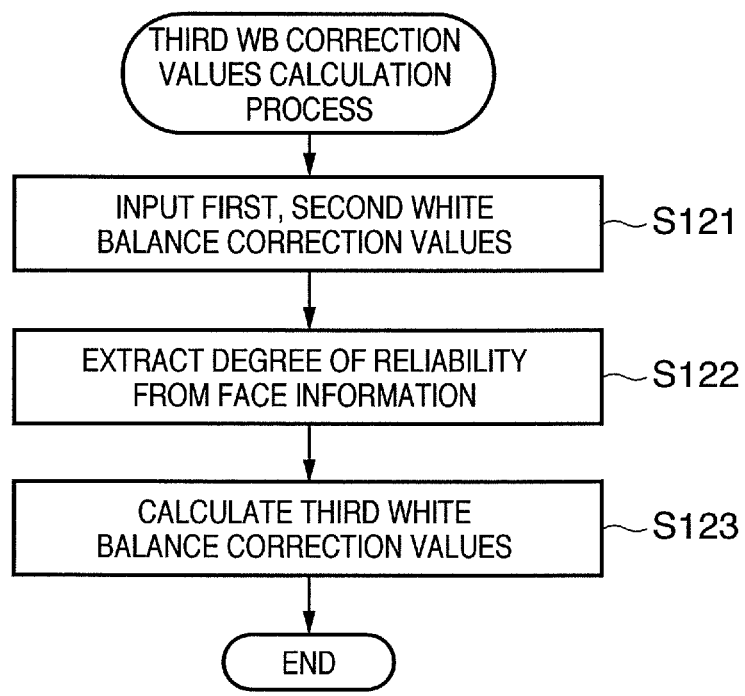
FIG. 10 is a flow chart illustrating a third WB correction values calculation process according to the first embodiment of the present invention.

FIG. 7 is a block diagram showing the detailed functional structure of the WB control unit 104, and FIGS. 8-10 are flow charts illustrating methods for calculating the WB correction values performed in the WB control unit 104.

The distinctive feature of the WB control unit 104 of the first embodiment is that it has first through third WB correction values calculation units 202-204. The first WB correction values calculation unit 202 calculates first WB correction values using conventional methods, without using the face information detected by the face detection unit 115. The second WB correction values calculation unit 203 calculates second WB correction values that provide color reproduction of complexion of the face area detected by the face detection unit 115. The third WB correction values calculation unit 204 calculates third WB correction values by weighting and adding the first WB correction values and the second WB correction values using weighted addition coefficients calculated from the face information. In addition, the WB control unit 104 of the first embodiment has a switch 201 that connects to a terminal 1 when the shutter switch, not shown, is depressed halfway (SW 1 ON) and connects to a terminal 0 in all other cases. Furthermore, the WB control unit 104 has a first WB correction values holding unit 205 that stores the third WB correction values calculated by the third WB correction values calculation unit 204 and a second WB correction values holding unit 206 that holds pre-set WB correction values. In addition, the WB control unit 104 has a switch 207 that connects to a terminal 1 when the shutter switch, not shown, is depressed halfway (SW 1 ON) or is depressed fully (SW 2 ON), and connects to a terminal 0 in all other cases. Moreover, the WB control unit 104 has a WB correction unit 208 that performs WB correction of the image signals stored in the memory 103 using the WB correction values stored in either the first or the second WB correction values holding units 205 or 206. With such a structure, when the shutter switch is not being operated (both SW 1 and SW 2 OFF), both the switches 201, 207 are connected to the terminals 0, and as a result, the image signals stored in the memory 103 are input to the WB correction unit 208 and the WB correction unit 208 performs WB correction using the predetermined WB correction values stored in the second WB correction values holding unit 206. It should be noted that although in FIG. 7 the first and second WB correction values holding units 205, 206 are shown to be inside the WB control unit 104, it goes without saying that the first and second WB correction values holding units 205, 206 may be placed outside the WB control unit 104 and a memory that can be written to and read from the WB control unit 104 may be used.

In step S27 of the focus-control/photometry/colorimetry process shown in FIG. 4, the shutter switch is pressed halfway (SW 1 ON), and therefore both switches 201, 207 are connected to the terminal 1 side and processes for calculating first WB correction values, second WB correction values and third WB correction values are performed. The following is a detailed description of the methods for calculating the first WB correction values, the second WB correction values and the third WB correction values.

Figure 22:
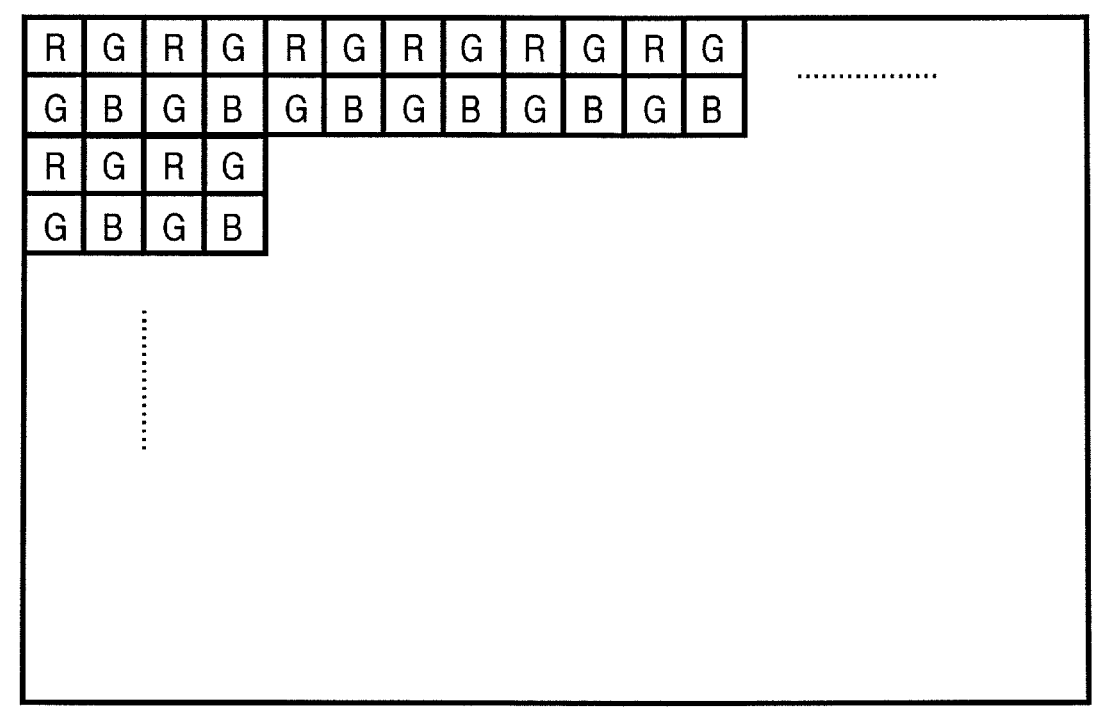

First, initially, a description is given of the first WB correction values calculation method performed by the first WB correction values calculation unit 202, with reference to FIG. 8. First, the image signals are output from the memory 103 and an image composed of the image signals is divided into an arbitrary number of blocks m as shown in FIG. 22 (step S101). Then, for each of the blocks (1 through m), the pixel values are added and averaged for each of the colors and color averages values (R[i], G[i], B[i]) are calculated, and color evaluation values (Cx[i], Cy[i]) are calculated using equation 1 (step S102):

$$Cx[i]=(R[i]-B[i])/Y[i]\times 1024$$

$$Cy[i]=(R[i]+B[i])-2G[i]/Y[i]\times 1024 \quad (1)$$

where Y[i]=R[i]+2G[i]+B[i] and [i] is the index number of the block.

Figure 23:
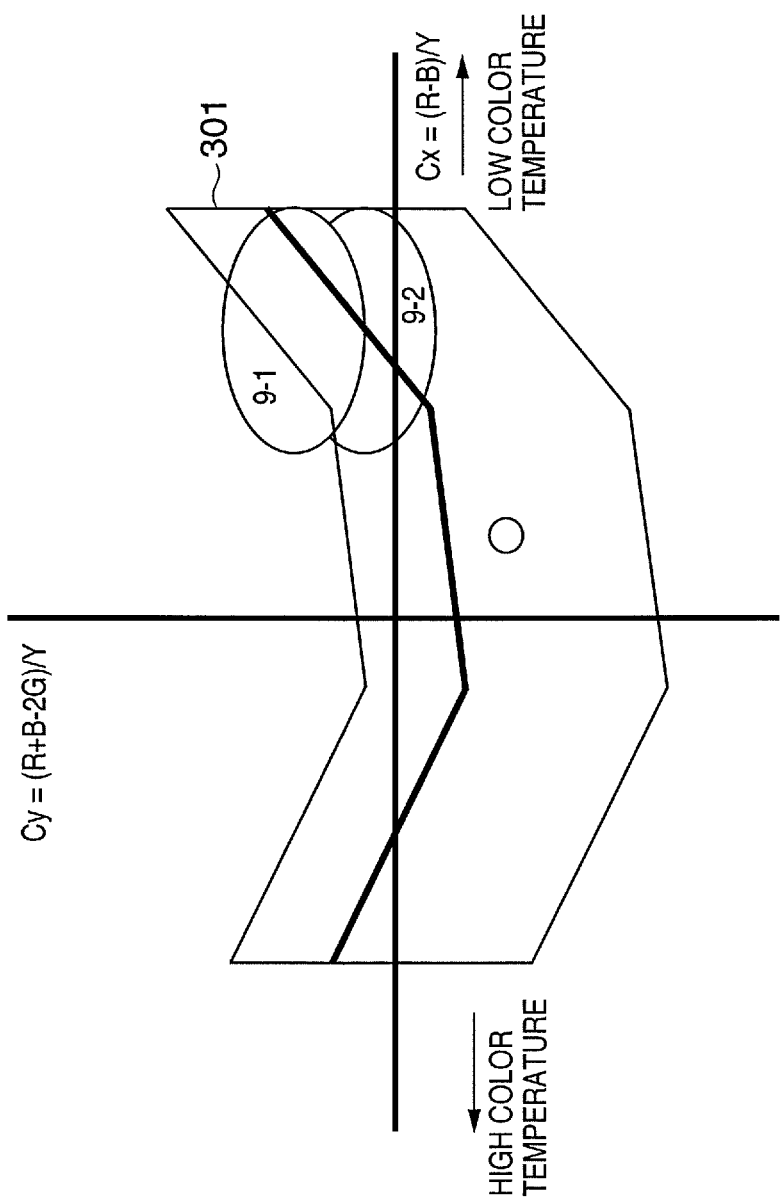
FIG. 23 is a diagram showing a white detection range.

Next, it is determined whether or not the color evaluation values (Cx[i], Cy[i]) of the $i^{th}$ block calculated in step S102 are included in the pre-set white detection range 301 shown in FIG. 23 (step S103). The white detection range 301 plots color evaluation values in which white is sensed under different light sources and color evaluation values calculated in advance. The negative direction of the x coordinate (Cx) shown in FIG. 23 indicates the color evaluation value when sensing the white of a high color temperature object and the positive direction indicates the color evaluation value when sensing the white of a low color temperature object. The y coordinate (Cy) indicates the green color component degree of the light source. The greater the extent in the negative direction the greater the G component, indicating that the light source is a fluorescent light.

If the color evaluation values (Cx[i], Cy[i]) of the $i^{th}$ block are within the white detection range 301 (YES in step S103), the block is deemed to be white and the color averages (R[i], G[i], B[i]) of the block are integrated (step S104). If the color evaluation values (Cx[i], Cy[i]) are not within the white detection range 301, the process proceeds to step S105 without integrating the color averages of the block. The processes of steps S103 and step S104 can be expressed by equation (3):

$$SumR = \sum_{i=0}^{m} Sw[i]\times R[i] \quad (3)$$

$$SumG = \sum_{i=0}^{m} Sw[i] \times G[i]$$

$$SumB = \sum_{i=0}^{m} Sw[i] \times B[i]$$

In equation (3), when the color evaluation values (Cx[i], Cy[i]) are within the white detection range 301 the Sw[i] is set to 1, and when they are not the Sw[i] is set to 0, by which the process of adding or not adding the corrected color averages (R[i], G[i], B[i]) is in essence performed.

In step S105, it is determined whether or not the process described above has been performed for all blocks. If unprocessed blocks remain, the process returns to step S102 and the processes described above are repeated. If all blocks have been processed, the process proceeds to step S106.

In step S106, the first WB correction values (WBCo1_R, WBCo1_G, WBCo1_B) are calculated from the sum values (sumR, sumG, sumB) of the color evaluation values obtained using equation (4) below:

WBCo1_R=sumY×1024/sumR

WBCo1_G=sumY×1024/sumG

WBCo1_B=sumY×1024/sumB   (4)

where sumY=(sumR+2×sumG+sumB)/4.

Next, a description is given of the second WB correction values calculation method performed by the second WB correction values calculation unit 203, with reference to FIG. 9. The second WB correction values calculation method in the first embodiment involves selecting the WB correction values, from a group of multiple pre-set WB correction values, which makes the hue (color reproduction) of the detected face area optimal. To facilitate the understanding of the description, first a description is given of a case in which a single face is detected.

First, the pixel values within the face area that is detected by the face detection unit 115 are added and averaged for each of the colors RGB and face area color averages (aveFaceR, aveFaceG, aveFaceB) are calculated (step S111).

Next, n WB correction values (WBCo_R[j], WBCo_G[j], WBCo_B[j], j=1~n) described later that are prepared for each of the color temperatures in advance by equation (5) and the color averages of the face area calculated in step S111 are multiplied. Then, corrected color averages (R[j], G[j], B[j]) of the face area as corrected by the WB correction values for each of the colors are calculated (step S112).

R[j]=aveFaceR×WBCo_R[j]

G[j]=aveFaceG×WBCo_G[j]

B[j]=aveFaceB×WBCo_B[j]   (5)

Here, a description is given of n WB correction values.

Figure 11:
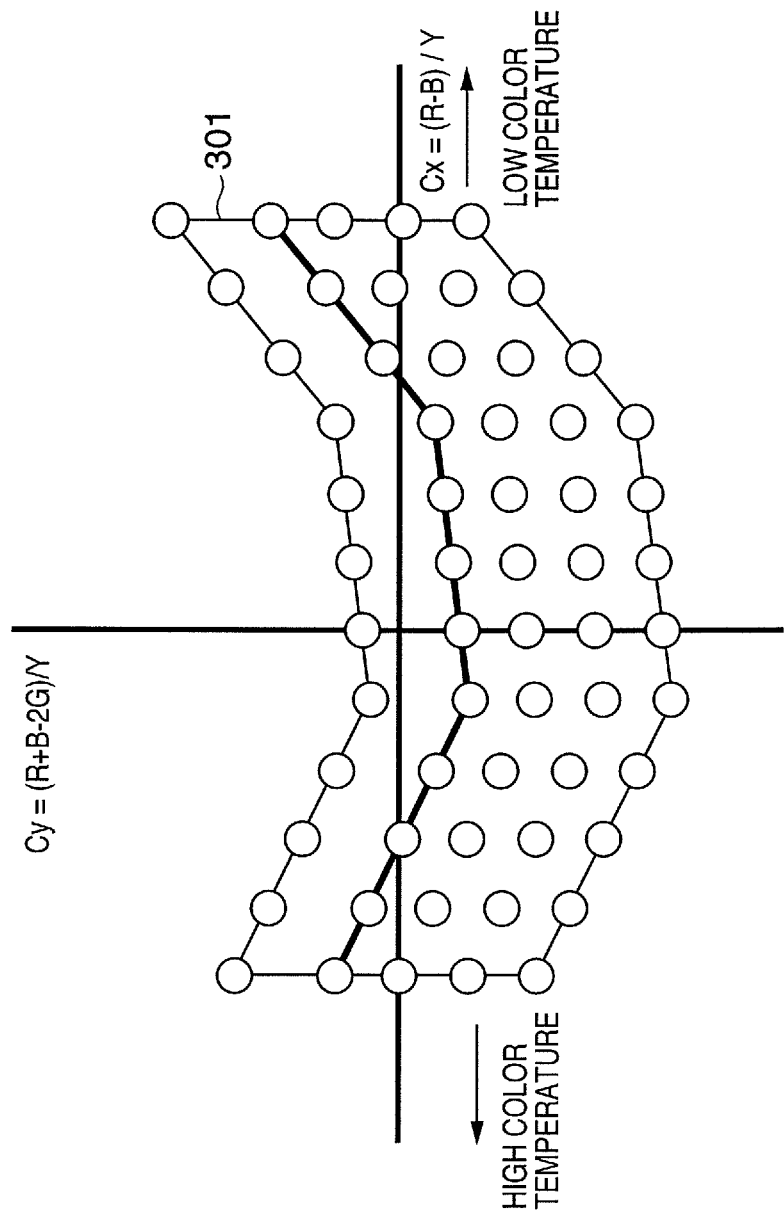
FIG. 11 is a diagram showing examples of color evaluation values corresponding to white detection ranges and WB correction values prepared in advance according to the first embodiment of the present invention.

Reference numeral 301 in FIG. 11 shows the same white detection range 301 as is shown in FIG. 23. The color evaluation values within the color detection range 301 are in a one-to-one correspondence with the WB correction values. Thus, if the color evaluation values are known, the WB correction values can be calculated by a formula like that below.

If in equation (1) described above Y[m]=1024, then

Cx[m]=R[m]−B[m]

Cy[m]=R[m]+B[m]−2G[m]

1024=R[m]+2G[m]+B[m]   (6)

If the simultaneous equation of equation (6) is solved, then the respective RGB pixel values become R[m]=2Cx[m]+Cy[m]+1024/4

G[m]=1024−Cy[m]/2

B[m]=−2Cx[m]+Cy[m]+1024/4   (7)

from which the WB correction values can be calculated. In the second WB correction values calculation method of the first embodiment, n color evaluation values and WB correction values calculated from those color evaluation values are correlated and stored at every given color temperature band (Cx) and at every given fluorescent light band (Cy) in advance as shown by the ○ points shown in FIG. 11. (WBCo_R[j], WBCo_G[j], WBCo_B[j], j=1~n). Then, the optimum WB correction values are selected therefrom by the following process and the second WB correction values are calculated.

Next, from the corrected color averages (R[j], G[j], B[j]) calculated as described above, face area color difference values (R−Y[j], B−Y[j]) are calculated from equation (8) (step S113):

R−Y[j]=R[j]−Y[j]

B−Y[j]=B[j]−Y[j]   (8)

where Y[j]=0.3×R[j]+0.59×G[j]+0.11×B[j], j1~n.

Next, from the face area color difference values (R−Y[j], B−Y[j]) calculated using equation (8), a hue angle value (Hue[j]) is calculated from equation (9) (step S114).

Hue[j]=tan$^{-1}$(R−Y[j]/B−Y[j])   (9)

Figure 12:
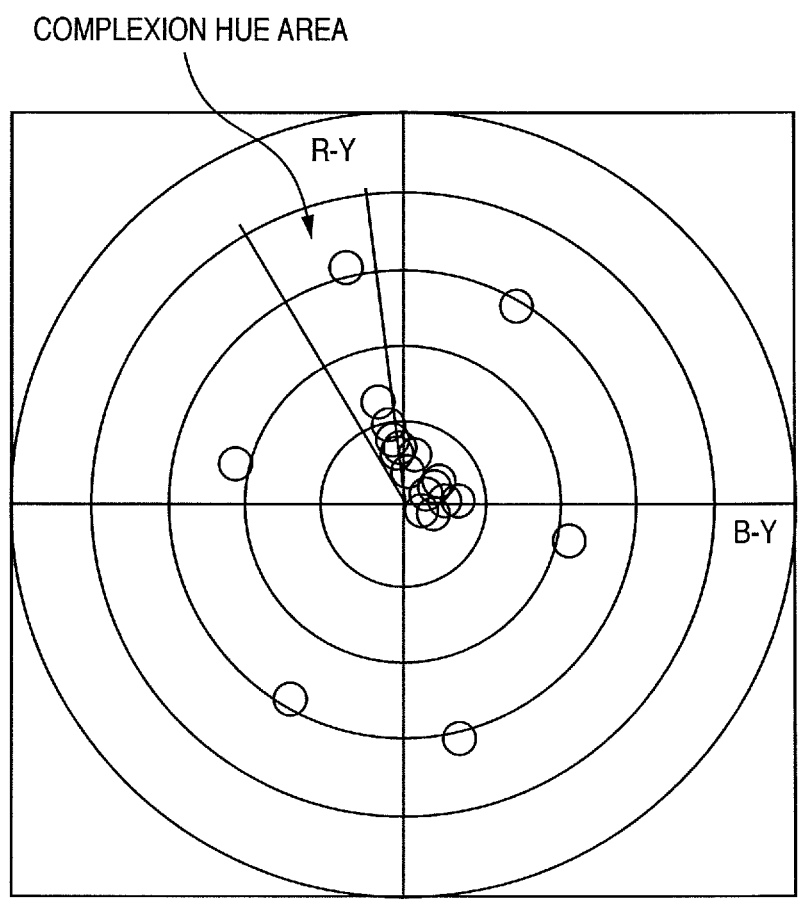
FIG. 12 is a diagram showing a complexion hue range according to the first embodiment of the present invention.

Then, it is determined if the calculated hue angle value is within the pre-set desirable complexion hue range shown in FIG. 12 (step S115). If so, then the WB correction values (WBCo_R[j], WBCo_G[j], WBCo_B[j]) used during calculation of the hue angle value are integrated (step S116). Then, the processes of from step S112 to step S116 are performed on the n WB correction values (WBCo_R[j], WBCo_G[j], WBCo_B[j]) prepared in advance (step S117).

When all n WB correction values have been processed, the sums of the calculated WB correction values are averaged and the second WB correction values are calculated (step S118). In other words, summing up step S112-step S118, the second WB correction values are given by the following equation (10):

$$WBCo2\_R = \left(\sum_{j=0}^{n} Sw[j] \times WBCo\_R[j]\right)/Num$$

$$WBCo2\_G = \left(\sum_{j=0}^{n} Sw[j] \times WBCo\_G[j]\right)/Num$$

$$WBCo2\_B = \left(\sum_{j=0}^{n} Sw[j] \times WBCo\_B[j]\right)/Num$$

(10)

In equation (10), among the n hue angle values calculated in step S114, when the value is within the complexion hue area shown in FIG. 12, then Sw[i] in equation (3) is set to 1, and when the value is not within the complexion hue area the Sw[i] is set to 0. As a result, the outcome of the determination made in step S115 essentially determines whether to add or not to add the WB correction values. In addition, Num indicates the number of hue angle values which contributed to set Sw[i] to 1 among the n hue angle values.

Next, a description is given of a third WB correction values calculation method performed by the third WB correction values calculation unit, with reference to FIG. 10.

The third WB correction values calculation method in the first embodiment selects or performs weighted addition of the first WB correction values and the second WB correction values in response to the degree of reliability of the face detected by the face detection unit 115 (see FIG. 2B), and outputs the results as third WB correction values. The reliability detected by the face detection unit 115 ranges from 1 to 0, with 1 indicating that the degree of reliability of the face detection is 100 percent and the degree of reliability declining as the value decreases.

First, in step S121, the first and second WB correction values calculated by the first and second WB correction values calculation units 202 and 203 are input. Next, from the face information output from the face detection unit 115, the degree of reliability (r) is extracted (step S122) and the third WB correction values (WBCo3_R, WBCo3_G, WBCo3_B) are calculated using the degree of reliability (r) using equation (11) below (step S123):

$$WBCo3\_R=(1-r)\times WBco1\_R+r\times WBco2\_R$$

$$WBCo3\_G=(1-r)\times WBco1\_G+r\times WBco2\_G$$

$$WBCo3\_B=(1-r)\times WBco1\_B+r\times WBco2\_B \qquad (11)$$

Accordingly, in the first embodiment, when the degree of reliability when a face is detected by the face detection unit 115 is high (r=1), 100 percent of the second WB correction values is used, and when the degree of reliability is low (r=0), 100 percent of the first WB correction values is used. For intermediate degrees, the first WB correction values and the second WB correction values are weighted and added together according to the degree of reliability. The face detection unit 115 sometimes erroneously detects textures that resemble the human face as a face, but by calculating the third WB correction values using equation (11) the malfunction of using second WB correction values calculated using a non-face area erroneously detected can be avoided.

In addition, it is possible to calculate the third WB correction values using the second WB correction values even when the area of the face occupies most of the image.

The third WB correction values calculated as described above are then stored in the first WB correction values holding unit 205. Then, when the shutter switch, not shown, is fully depressed (SW 2 ON) and the image sensing process is performed, the color processing of step S36 shown in FIG. 5 is performed. At this time, the WB correction unit 208 performs WB correction on the image signals read from the memory 103 through the terminal 0 of switch 201 using the third WB correction values input through the terminal 1 of switch 207.

The foregoing description describes a case in which a single face is detected when calculating the second WB correction values. By contrast, a description is now given of calculation method of calculating the second WB correction values when multiple faces are detected, with reference to the flow chart shown in FIG. 13. Here, two faces are detected as shown in FIG. 2A.

First, in step S131, based on the face information obtained from the face detection unit 115, the number of face areas detected is acquired (Face1, Face2).

Then, for each face area, the process described above with reference to steps S111-S118 shown in FIG. 9 is performed and second WB correction values for each face area are calculated (step S132). Step S132 is repeated until the processing of all face areas is finished in step S133.

Here, as shown in FIG. 2A, there are two face areas, and therefore two sets of WB correction values are calculated, Face1 second WB correction values and Face1 second WB correction values. Here, the second WB correction values of Face 1 are WBCo2_R_Face[1], WBCo2_G_Face[1], WBCo2_B_Face[1], and the second WB correction values of Face 2 are WBCo2_R_Face[2], WBCo2_G_Face[2], WBCo2_B_Face[2].

Next, weighted addition coefficients MixRatio[i] are calculated from the degree of reliability values (r[1]=F1(rel), r[2]=F2(rel)) included in the face information using equation (12) (step S134):

$$MixRatio[1]=r[1]/(r[1]+r[2])$$

$$MixRatio[2]=r[2]/(r[1]+r[2]) \qquad (12)$$

These equations are designed so that, of the detected face areas, more WB correction values calculated from areas with a high degree of reliability of actually being a face are used. Next, with the weighted addition coefficients MixRatio[i] calculated in step S134, the two sets of second WB correction values calculated in step S132 are weighted and added using equation (13) (step S135):

$$WBCo2\_R=(MixRatio[1]\times WBCo2\_R\_Face[1]+ \\ MixRatio[2]\times WBCo2\_R\_Face[2])$$

$$WBCo2\_G=(MixRatio[1]\times WBCo2\_G\_Face[1]+ \\ MixRatio[2]\times WBCo2\_G\_Face[2])$$

$$WBCo2\_B=(MixRatio[1]\times WBCo2\_B\_Face[1]+ \\ MixRatio[2]\times WBCo2\_B\_Face[2]) \qquad (13)$$

Those which are obtained by weighted addition in the foregoing manner are the second WB correction values.

It should be noted that, it is possible to calculate the third WB correction values using the procedure shown in FIG. 10 described above, and when multiple face areas are detected the average of the degrees of reliability calculated in step S122 is calculated and used in step S123. For example, when two face areas are detected and the degrees of reliability of the face areas is r[1]=F1(rel), r[2]=F2(rel), the degree of reliability r used when calculating the third WB correction values is r=(r[1]+r[2])/2.

Figure 13:
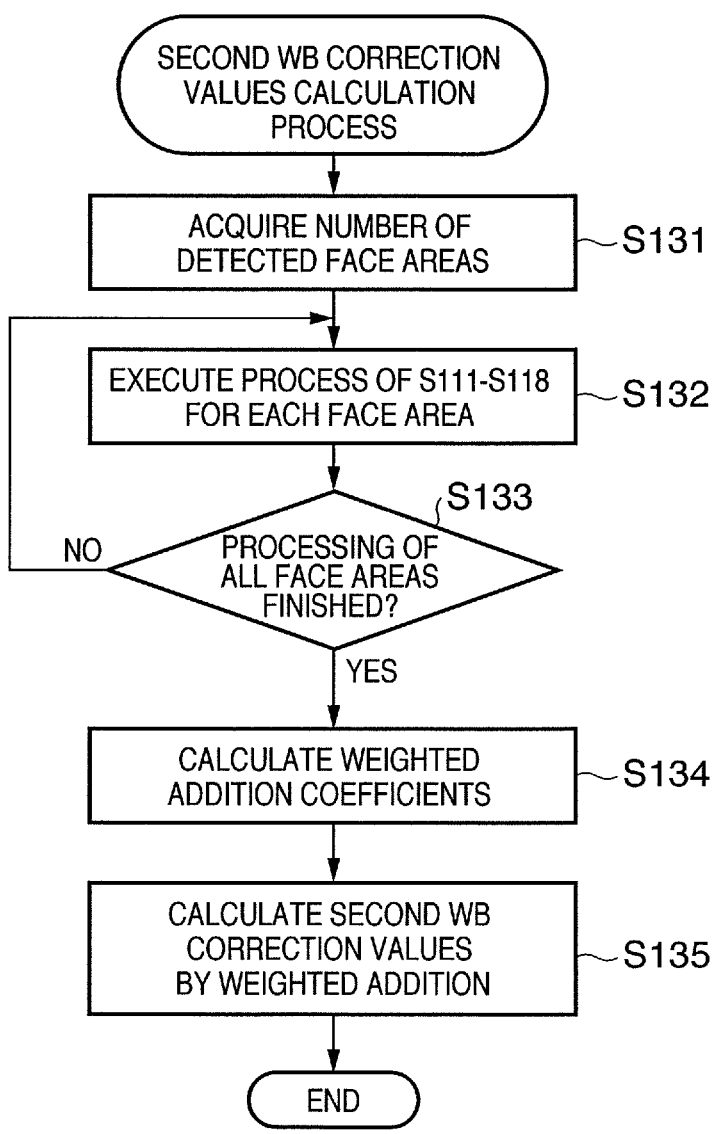
FIG. 13 is a flow chart illustrating the second WB correction values calculation process in a case in which multiple face areas are detected according to the first embodiment of the present invention.

It should be noted that although the calculation of the weighted addition coefficients MixRatio[i] performed in step S134 shown in FIG. 13 described above uses a degree of probability r[i] that is a quantification of the probability that the information in the face information represents a face, alternatively the techniques described below may be used.

Example (1)

Figure 14:
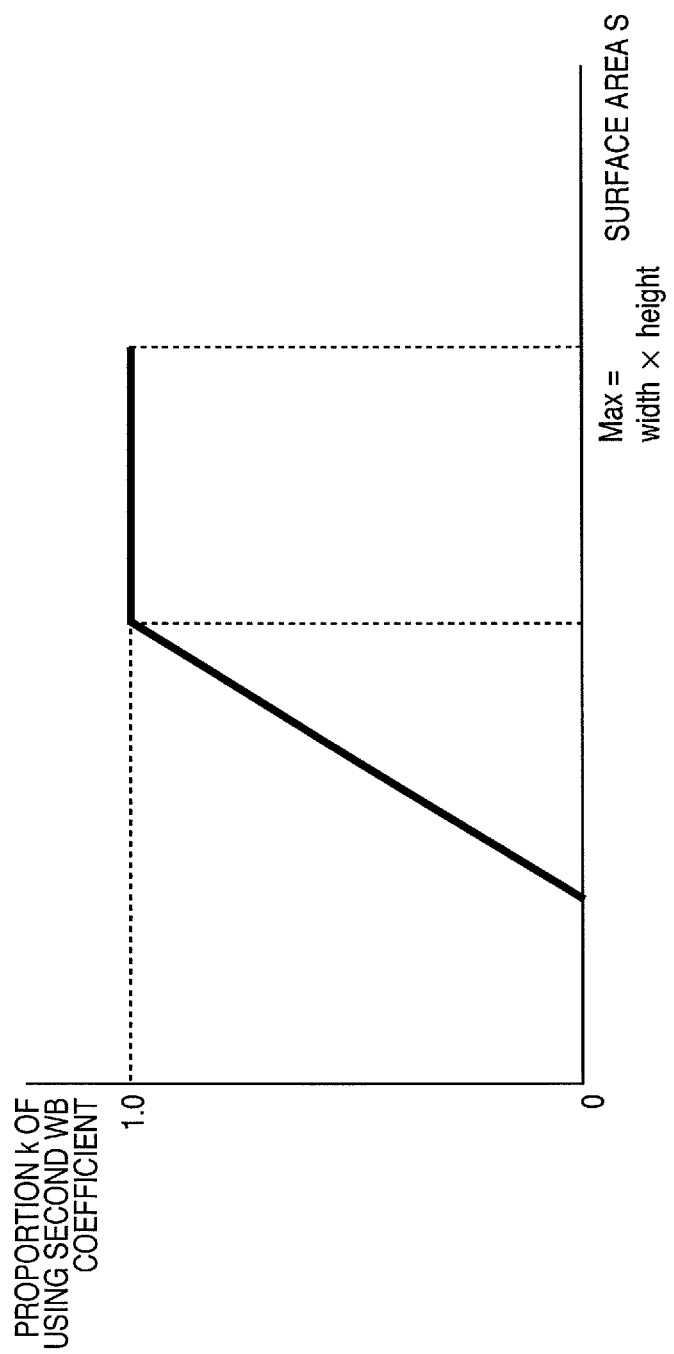
FIG. 14 is a diagram showing characteristics for calculating weighted addition coefficients according to the first embodiment of the present invention.

Use values from 0 to 1 calculated in accordance with the surface area of the face area. This technique optimizes the WB correction values for objects representing close-ups of the face first. First, the surface area S[i] (where i is the face area index number) of each face area is calculated by equation (14) using the face information detected by the face detection unit 115. Then, the MixRatio[i] is calculated using equation (12), with r[i] as values obtained using a graph like that shown in FIG. 14, with the surface area S[i] of the face as input and weighted addition coefficients k[i] as output. For example, when two faces are calculated as shown in FIG. 2A, the surface area S[i] is $$S[1]=(x1[1]-x0[1])\times(y1[1]\times y0[1])$$

$$S[2]=(x1[2]-x0[2])\times(y1[2]-y0[2]) \qquad (14)$$

Example (2)

Figure 15:
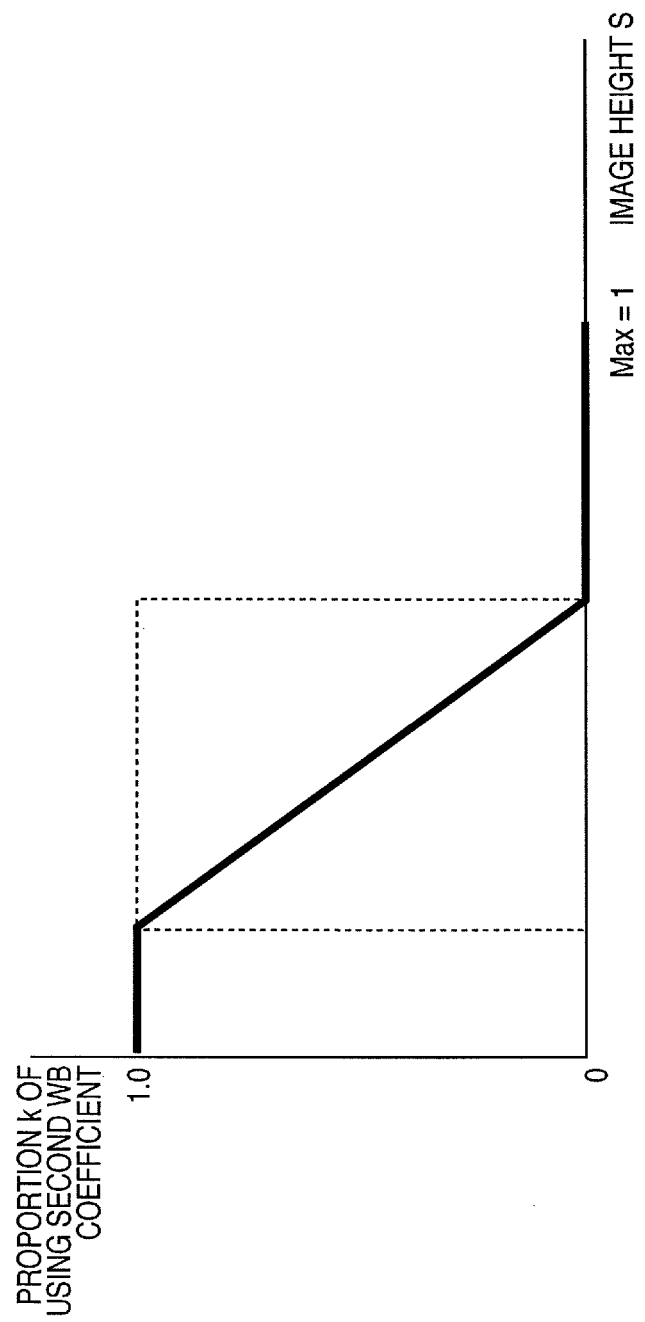
FIG. 15 is a diagram showing characteristics for calculating weighted addition coefficients according to the first embodiment of the present invention.

Use values from 0 to 1 calculated in accordance with the face coordinate values. This technique optimizes the WB correction values for objects in the center of the screen first. An image height (FaceDis[i]) (where [i] is the face area index number) of each of the face areas is calculated from the center coordinates of the face information detected by the face detection unit 115 (x_Center[i], y_Center[i]), the center coordinates of the sensed screen (CenterX, CenterY) and the distance from the center of the screen to opposite corners of the screen, and the MixRatio[i] is calculated using equation (12), with r[i] as values obtained using a graph like that shown in FIG. 15, with the height of the image as input and weighted addition coefficients k[i] as output.

$$FaceDis[i] = \sqrt{(x\_Center[i] - CenterX)^2 + (y\_Center[i] - CenterY)^2} \Big/ R \quad (15)$$

It should be noted that it is also possible to use values obtained by any combination of the method described in step S134 above and the methods described in Example (1) and Example (2). For example, new weighted addition coefficients can be calculated by multiplying the weighted addition coefficients calculated from the degree of reliability of the face detection by the weighted addition coefficients calculated from the surface area of the face. This is a coefficient that further weights a face with a high probability of being a face with the surface area.

In addition, although in the foregoing description the average of the degrees of reliability (r[i]) of each of the face areas when multiple face areas are detected is used as the degree of reliability (r) used when calculating the third WB correction values, the degree of reliability (r) may be calculated using other methods. For example, if the camera is equipped with a mode that provides optimal color reproduction of the face of a person registered in advance, the optimum WB correction values may be calculated only for such pre-registered person, such that r=the degree of reliability (1-0) of a particular person which makes it possible to obtain the best WB correction values for a pre-registered person.

In addition, when the digital camera is equipped with a complexion priority mode, and that complexion priority mode is selected, the second WB correction values may be output as the third WB correction values so that the face acquires its optimum complexion.

Although in the foregoing description the weighting and combining of the first WB correction values and the second WB correction values are performed according to the degree of reliability of the faces detected by the face detection unit 115, alternatively the following structure may be used.

A control member that enables the photographer to set the proportions of the second WB correction values to be used may be provided on the image sensing apparatus. The control member may, for example, be something capable of being set in increments of 0.1 through a range from 0 to 1. For example, when set at 0, the CPU 116 controls to use only the first WB correction values. When set at 0.4, for example, the CPU 116 controls to calculate the third WB correction values by adding 60% of the first WB correction values and 40% of the second WB correction values. When set at 1, the CPU 116 controls to use only the second WB correction values.

In addition, although in the foregoing description the proportions of the correction values can be changed when weighting and combining the first WB correction values and the second WB correction values, alternatively, matters may be arranged so that half the first WB correction values and half the second WB correction values are always used when calculating the third WB correction values.

Second Embodiment

Next, a description is given of a second embodiment of the present invention.

Figure 16:
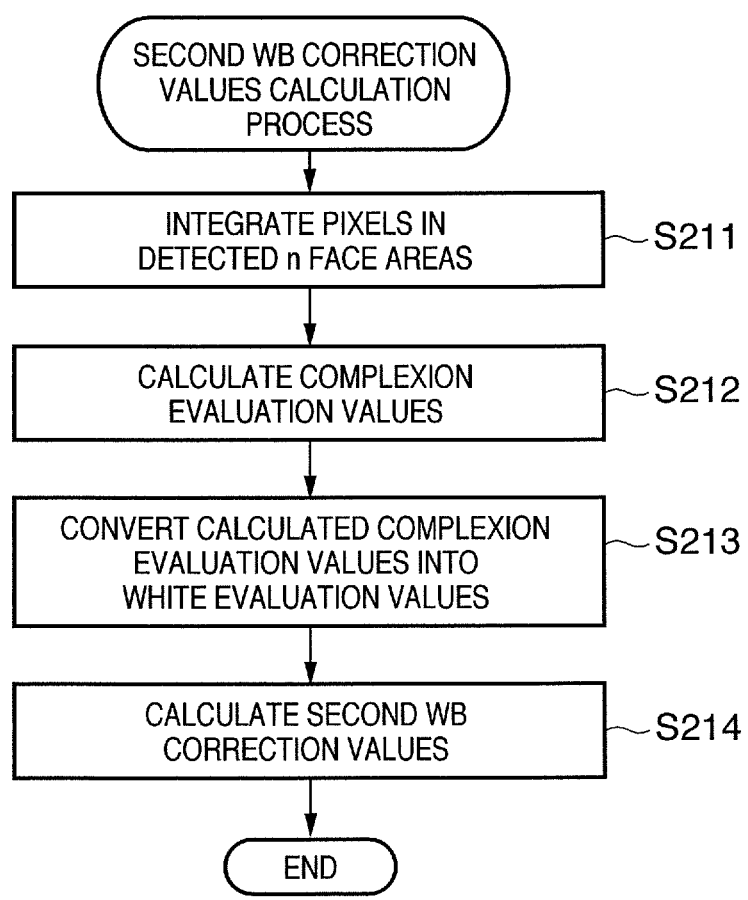
FIG. 16 is a flow chart illustrating a second WB correction values calculation process according to a second embodiment of the present invention.

In this second embodiment, the second WB correction values calculation method differs from that in the first embodiment. The remaining structures and processes are the same as those of the first embodiment and thus a description thereof is omitted here. A description is given of the second WB correction values calculation method in the second embodiment, with reference to FIG. 16.

In the second WB correction values calculation method, the second WB coefficients are calculated in the following manner: First, color evaluation values (called "complexion evaluation values" in the second embodiment) are calculated from the face area detected by the face detection unit 115, and evaluation values of white color (called "white evaluation value" in the second embodiment) are calculated based on a pre-set complexion evaluation value-white color evaluation value straight line. The second WB coefficients are then calculated from the white evaluation values.

First, the pixel values within the face area detected by the face detection unit 115 are added and averaged for each of the colors RGB and color averages of a face area (aveFaceR[i], aveFaceG[i], aveFaceB[i]) are calculated (step S211). It should be noted that i is the index number of the detected face area.

From the color averages calculated in step S211 complexion evaluation values CxSkin[i], CySkin[i] are calculated (step S212) using equation (16):

$$CxSkin[i]=(aveFaceR[i]-aveFaceB[i])/Y[i]\times1024$$

$$CySkin[i]=(aveFaceR[i]+aveFaceB[i])-2aveFaceG[i]/Y[i]\times1024 \quad (16)$$

where Y[i]=aveFaceR[i]]+2aveFaceG[i]+aveFaceB[i] and [i] is the index number of the detected face area.

Next, the complexion evaluation values (CxSkin[i], CySkin[i]) are converted into white evaluation values (Cx[i], Cy[i]) for each of the face areas using a straight-line correspondence between pre-set complexion evaluation values (CxSkin, CySkin) vs. white evaluation values (CxWhite, CyWhite) like those shown in FIGS. 17A, 17B (step S213). From the white evaluation values calculated for each of the face areas, the color values (R[i], G[i], B[i]) are calculated using equation (7), and from the calculated color values the second WB correction values are first calculated for each area using equation (17) (step S214):

$$WBco2\_R[i]=Y[i]\times1024/R[i]$$

$$WBco2\_G[i]=Y[i]\times1024/G[i]$$

$$WBco2\_B[i]=Y[i]\times1024/B[i] \quad (17)$$

where Y[i]=(R[i]+2×G[i]+B[i])/4.

When there is only one face area detected by the face detection unit 115, the second WB correction values are determined by equation (17). However, when there are two or more face areas detected, the second WB correction values are determined as described in the first embodiment. First, using equation (12), weighted addition coefficients MixRatio [i] of the degrees of reliability of the face areas are calculated. Then, using the weighted addition coefficient MixRatio[i], the second WB correction values calculated using equation (13) are weighted and added and the values thus obtained are the second WB correction values.

Although in the foregoing description the weighting and combining of the first WB correction values and the second WB correction values are performed according to the degree of reliability of the faces detected by the face detection unit 115, alternatively the following structure may be used.

A control member that enables the photographer to set the proportions of the second WB correction values to be used may be provided on the image sensing apparatus. The control member may, for example, be something capable of being set in increments of 0.1 through a range from 0 to 1. For example, when set at 0, the CPU 116 controls to use only the first WB correction values. When set at 0.4, for example, the CPU 116 controls to calculate the third WB correction values by adding 60% of the first WB correction values and 40% of the second WB correction values. When set at 1, the CPU 116 controls to operate using only the second WB correction values.

In addition, although in the foregoing description the proportions of correction values can be changed when weighting and combining the first WB correction values and the second WB correction values, alternatively, matters may be arranged so that half the first WB correction values and half the second WB correction values are always used when calculating the third WB correction values.

Third Embodiment

Next, a description is given of a third embodiment of the present invention.

In this third embodiment, the WB correction values calculation method differs from those in the first and second embodiments, and is executed instead of the process of calculating first-third WB correction values described in the first embodiment in step S127 shown in FIG. 4 and described in the first embodiment. It should be noted that the structure of the image sensing apparatus is the same as that shown in FIG. 1, and the image sensing process is the same as that described with reference to FIGS. 3-6, and therefore descriptions thereof are omitted here.

Figure 18:
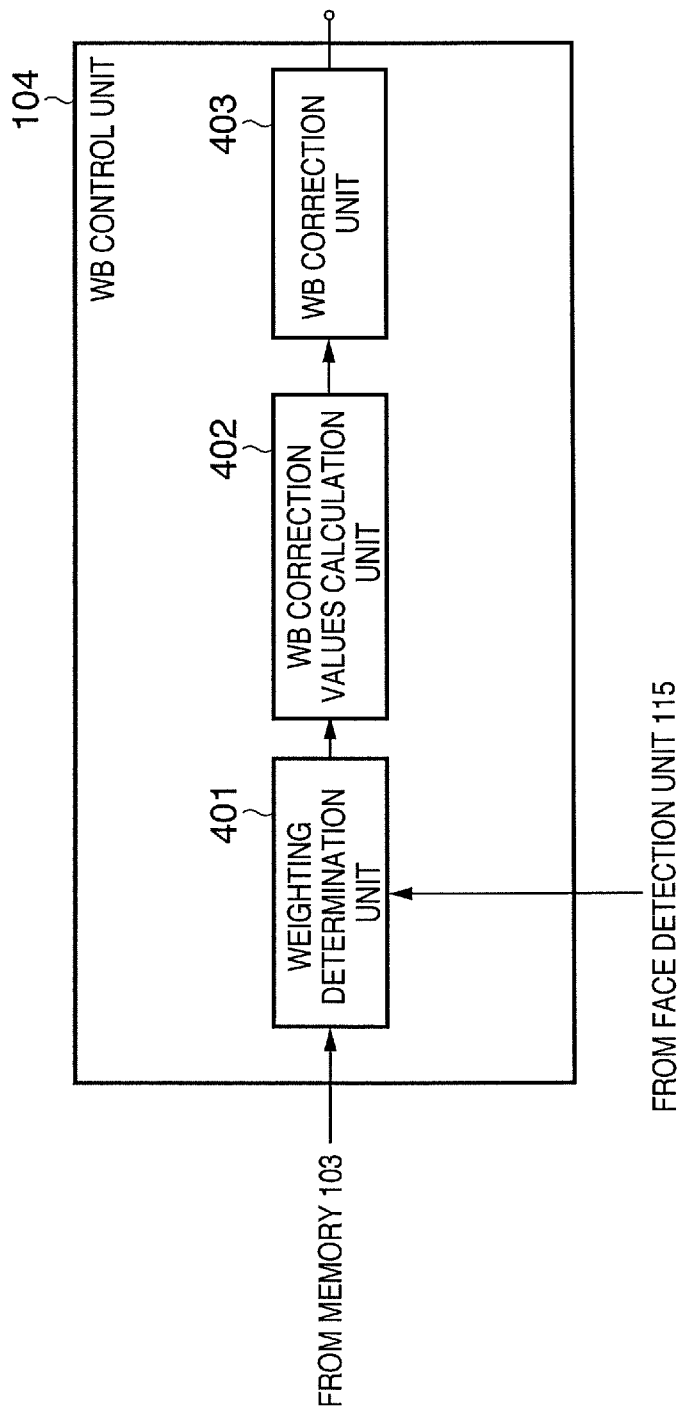
FIG. 18 is a block diagram showing the functional structure of a WB control unit according to a third embodiment of the present invention.

FIG. 18 is a block diagram showing the functional structure of the WB control unit 104 according to the third embodiment of the present invention. In FIG. 18, reference numeral 401 indicates a weighting determination unit, 402 indicates a WB correction values calculation unit and 403 indicates a WB correction unit.

Figure 19:
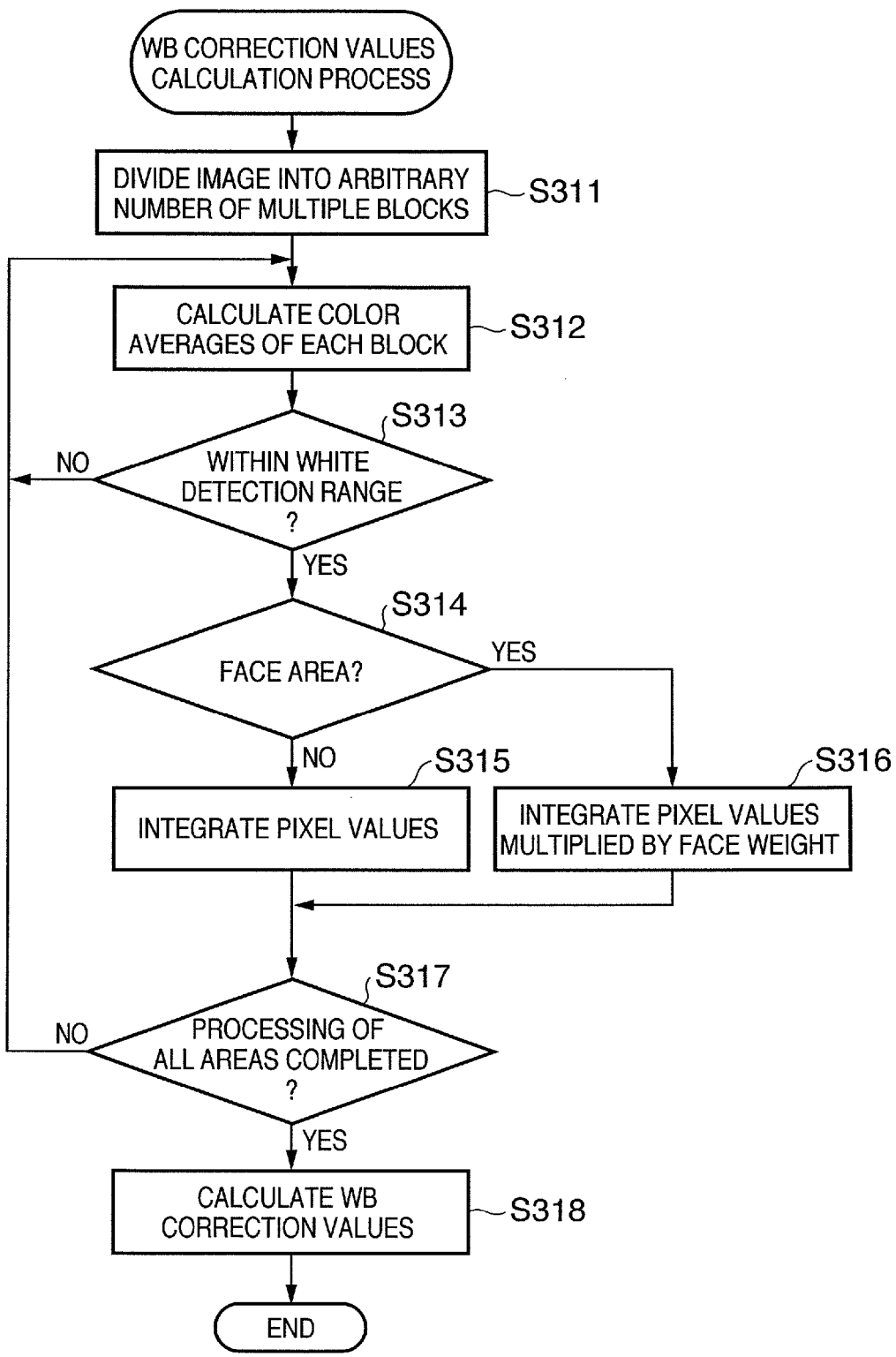
FIG. 19 is a flow chart illustrating a WB correction values calculation process according to the third embodiment of the present invention.

A description is now given of a WB correction values calculation method in the third embodiment performed in step S27 shown in FIG. 4 by a WB control unit 104 having the structure shown in FIG. 18, with reference to FIG. 19.

First, image signals stored in the memory 103 are read out and the resulting screen is divided into, for example, an arbitrary number of blocks m as shown in FIG. 22 (step S311). Then, at each of the m blocks, the pixel values within each of the blocks are added and averaged for each color, color averages (R[i], G[i], B[i]) calculated, and color evaluation values (Cx[i], Cy[i]) calculated using equation (1) described above (step S312).

Next, it is determined whether or not the color evaluation values (Cx[i], Cy[i]) calculated in step S312 are included in the pre-set white detection range 301 shown in FIG. 23 (step S313). If the color evaluation values (Cx[i], Cy[i]) are not within the white detection range 301, the process returns to step S312 and processing of the next block proceeds. If the color evaluation values (Cx[i], Cy[i]) are within the white detection range 301, the process goes to step S314 and it is determined whether or not the color evaluation values (Cx[i], Cy[i]) are in the detected face area detected by the face detection unit 115.

If the color evaluation values (Cx[i], Cy[i]) are not in the face area, the color evaluation values (Cx[i], Cy[i]) of that block are integrated (step S315). If the color evaluation values (Cx[i], Cy[i]) are in the face area, then the color evaluation values (Cx[i], Cy[i]) are weighted with a weight (FaceWeight [i]) calculated from the face information and integrated (step S316). It should be noted that the process of step S313-S316 is implemented by the following equation (18):

$$SumR = \sum_{i=0}^{m} Sw[i] \times R[i] \times FaceWeight[i]$$

$$SumG = \sum_{i=0}^{m} Sw[i] \times G[i] \times FaceWeight[i]$$

$$SumB = \sum_{i=0}^{m} Sw[i] \times B[i] \times FaceWeight[i]$$

(18)

where r is the degree of reliability value of the face area i, and Sw[i] is 1 when the color evaluation values (Cx[i], Cy[i]) are included within the white detection range 301 and 0 when not included.

Here, a description is given of the method for calculating the FaceWeight using the face information. In the WB correction values calculation method in the third embodiment, because the purpose is to remove from pixel integration those areas that are detected to be a face out of blocks deemed to be white, the FaceWeight is calculated using the degree of reliability r. For example, in a face area whose degree of reliability is 100 percent, the weight is 0 so that the color evaluation values of that area is not integrated, whereas a face area whose degree of reliability is 0 percent is given a weight of 1 so that the color evaluation values of that area are integrated. The FaceWeight is calculated using equation (19) below:

FaceWeight[i]=−r[i]+1 (19)

where r is the degree of reliability in the face area i.

It is then determined if the process described above is completed for all blocks (step S317). If all blocks have been processed, then the WB correction values are calculated using the integrated color averages (SumR, SumG, SumB) by equation (20) below (step S318):

WBCo_R=sumY×1024/sumR

WBCo_G=sumY×1024/sumG

WBCo_B=sumY×1024/sumB (20)

where sumY=(sumR+2×sumG+sumB)/4.

By calculating the WB correction values as described above, when the blocks that are deemed white are within the face area, a weight is assigned based on the degree of reliability of the face information and the color averages integrated, and therefore it is possible to calculate the WB correction values according to the accuracy of detection of the face area.

<First Variation>

In the first through third embodiments described above, when the shutter switch, not shown, is pressed halfway (SW 1 ON) in FIG. 3, the face detection of and the WB correction values calculation are performed during the focus-control/photometry/colorimetry process performed in step S12. By contrast, in this first variation, calculations are not performed at this timing but instead are performed when the image sensing process is performed, when the shutter switch is fully depressed (SW 2 ON). At this time, using the image signals obtained by image sensing, face detection, calculation of the first through third WB correction values and WB correction are performed at the same time as the image signal color processing of step S36 shown in FIG. 5.

<Second Variation>

In a second variation, when the shutter switch, not shown, is pressed halfway (SW 1 ON) in FIG. 3, face detection and calculation of only the second WB correction values are performed, and face detection and WB correction values calculation are performed at the same time as the image sensing process of step S15 performed when the shutter switch is fully depressed (SW 2 ON). At this time, using the image signals obtained by image sensing, calculation of the first and third WB correction values and WB correction are performed at the same time as the image signal color processing of step S36 shown in FIG. 5.

<Third Variation>

Next, a description is given of a third variation.

In the third variation, the timing of the face detection and the calculation of the WB correction values changes in response to a scene change. A description is given below with reference to FIGS. 20 and 21.

Figure 20:
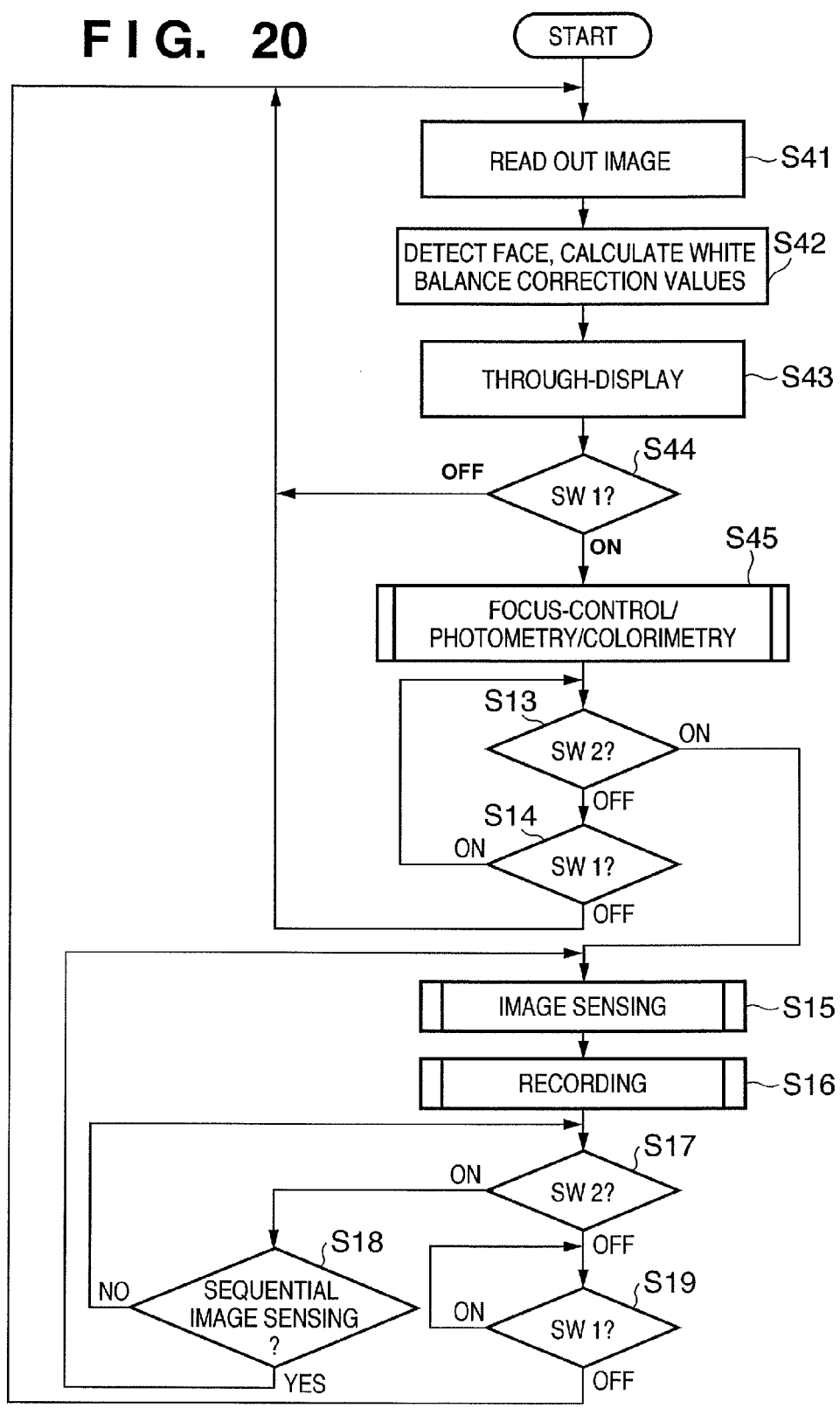
FIG. 20 is a flow chart illustrating the image sensing process in a third variation of the present invention.

FIG. 20 is a flow chart illustrating the image sensing process of the image sensing apparatus of the third variation. First, in step S41, electrical signals are output from the image sensing element 101 and image signals from which the dark current has been removed by the OB correction circuit 102 are written consecutively to the memory 103. Next, in step S42, using the image signals written to the memory 103 and any of the methods described in the first through third embodiments described above, face detection and WB correction values calculations are performed. It should be noted that, in the methods of the first and second embodiments, what is here called the WB correction values means the first through third WB correction values.

Next, in step S43, a well-known through-display process is performed on an image display unit, not shown, using the image signals written to the memory 103. In step S44, it is determined whether or not the shutter switch, not shown, has been pressed halfway (SW 1 ON). If the shutter switch has not been pressed halfway, the process proceeds to step S41. If the shutter switch has been pressed halfway, the process proceeds to step S45 and the focus-control/photometry/colorimetry process according to the third variation is performed. From this point onward, processing is the same as processing from step S13 onward described with reference to FIG. 3 in the first embodiment described above, and therefore a description thereof is omitted here.

Figure 21:
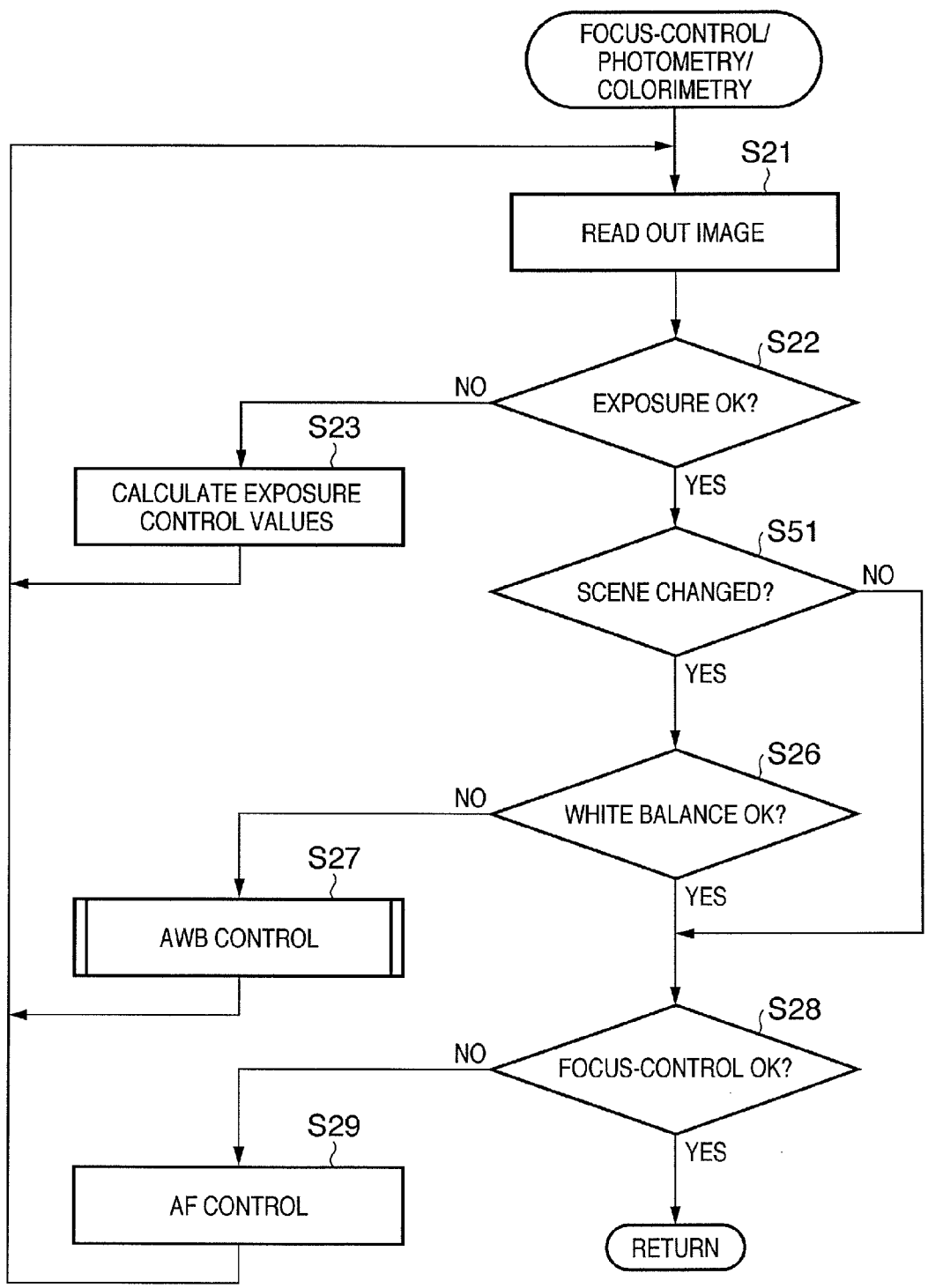
FIG. 21 is a flow chart illustrating a focus-control/photometry/colorimetry process according to the third variation of the present invention.

Next, a description is given of the focus-control/photometry/colorimetry process performed in step S45, with reference to FIG. 21. However, steps that are identical to those shown in FIG. 4 are given the same reference numerals and a description thereof omitted. In the focus-control/photometry/colorimetry process according to the third variation, prior to confirming the status of the white balance, the image read in at step S21 and the image read in for through-display prior to pressing the shutter halfway (SW 1 ON) shown in FIG. 20 are compared. Then, it is determined whether or not there is a scene change (step S51). This determination is made, for example, by obtaining the sum of the differences between the image output in step S21 and the through image, and determining that there is a scene change when that sum exceeds a predetermined value.

If the results of this determination indicate that there is a scene change, the process proceeds to step S26 and the white balance state and WB correction values are again obtained. If there is no scene change, then the WB correction values calculated in step S42 shown in FIG. 20 are used and step S26 and step S27 are skipped.

The above-described process enables the time need for the focus-control/photometry/colorimetry process when there is no change of scene to be shortened, and therefore the release time lag can be shortened.

<Fourth Variation>

In a fourth variation, face detection is performed and the second WB correction values are obtained during through-display, with the first and third WB correction values calculated in the focus-control/photometry/colorimetry process after the shutter switch is pressed halfway (SW 1 ON).

<Fifth Variation>

In a fifth variation, face detection is performed during through-display and the WB correction values are calculated in the focus-control/photometry/colorimetry process after the shutter switch is pressed halfway (SW 1 ON).

<Sixth Variation>

In a sixth variation, face detection is performed during through-display, the second WB correction values are calculated in the focus-control/photometry/colorimetry process after the shutter switch is pressed halfway (SW 1 ON), and further, the first and third WB correction values are calculated by the color processing after the shutter switch is fully depressed (SW 2 ON).

<Seventh Variation>

In a seventh variation, face detection is performed in the focus-control/photometry/colorimetry process after the shutter switch is pressed halfway (SW 1 ON), with the WB correction values calculated in the color processing after the shutter switch is fully depressed (SW 2 ON).

Such an arrangement enables the timing of the face detection and the calculation of the WB correction values to be changed as convenient.

Other Embodiments

It should be noted that the present invention can also be executed in an image processing apparatus that inputs and processes either the sensed images signals as is (RAW image data) or image data obtained by lossless-compressing RAW image data.

The invention can also be implemented by supplying a software program, which implements the functions of the foregoing embodiments, directly or indirectly, to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus that senses objects and processes image signals obtained from such image sensing, comprising:

a face detection unit adapted to detect a face area from said image signals and to acquire a degree of reliability indicating a probability that said detected face area shows a face; and a white balance correction unit to calculate integral color evaluation values using image signals and to perform white balance correction using white balance correction values corresponding to the calculated integral color evaluation values, wherein said white balance correction unit calculates the integral color evaluation values by calculating color evaluation values for each of a plurality of divisions of the image signals, and integrating while weighting the calculated color evaluation values for each of the plurality of divisions of the image signals by weights determined based on the degree of reliability, with the weight being larger as the degree of reliability is smaller.

2. The image sensing apparatus according to claim 1, wherein said white balance correction unit integrates the color evaluation values within a predetermined white detection area.

3. An image processing method for processing image signals obtained by an image sensing apparatus, comprising:

a face detection step of detecting a face area from said image signals and acquiring a degree of reliability indicating a probability that said detected face area shows a face; and a white balance correction step of calculating integral color evaluation values using image signals and performing white balance correction using white balance correction values corresponding to the calculated integral color evaluation values, wherein said white balance correction step calculates the integral color evaluation values by calculating color evaluation values for each of a plurality of divisions of the image signals, and integrating while weighting the calculated color evaluation values for each of the plurality of divisions of the image signals by weights determined based on the degree of reliability, with the weight being larger as the degree of reliability is smaller.

4. The image processing method according to claim 3, wherein in said white balance correction step, the color evaluation values within a predetermined white detection area are integrated.

* * * * *